United States Patent [19]

Sagawa et al.

[11] Patent Number: 5,408,638
[45] Date of Patent: Apr. 18, 1995

[54] METHOD OF GENERATING PARTIAL DIFFERENTIAL EQUATIONS FOR SIMULATION, SIMULATION METHOD, AND METHOD OF GENERATING SIMULATION PROGRAMS

[75] Inventors: Nobutoshi Sagawa, Kokubunji, Japan; Donal Finn, Dublin; Neil Hurley, Sligo, both of Ireland

[73] Assignee: Hitachi, Ltd., Tokyo, Japan

[21] Appl. No.: 808,111

[22] Filed: Dec. 16, 1991

[30] Foreign Application Priority Data

Dec. 21, 1990 [IE] Ireland ................... 4655/90

[51] Int. Cl.$^6$ ................... G06F 15/328; G06F 15/40
[52] U.S. Cl. ................... 395/500; 395/600; 364/548
[58] Field of Search ............ 395/500, 600, 700; 364/191, 578

[56] References Cited

U.S. PATENT DOCUMENTS

| | | | |
|---|---|---|---|
| 3,670,310 | 6/1972 | Bharwani et al. | 395/600 |
| 4,255,796 | 3/1981 | Gabbe et al. | 395/600 |
| 4,742,473 | 5/1988 | Shugar et al. | |
| 4,819,161 | 4/1989 | Konno et al. | 364/191 |
| 4,972,334 | 11/1990 | Yamabe et al. | 395/500 |
| 5,029,119 | 7/1991 | Konno | 364/578 |
| 5,129,035 | 7/1992 | Saji et al. | 395/1 |
| 5,148,379 | 9/1992 | Konno et al. | 364/578 |
| 5,159,687 | 10/1992 | Richburg | 395/700 |
| 5,235,701 | 8/1993 | Ohler et al. | 395/600 |

FOREIGN PATENT DOCUMENTS

| | | |
|---|---|---|
| 2215889 | 9/1989 | United Kingdom. |
| 9000290 | 1/1990 | WIPO. |

OTHER PUBLICATIONS

Elzas et al., "Modelling And Simulation Methodology, Knowledge System's Paradigms", Elsevier Science Publisher B.V. Netherland 1989, pp. 197–206.

"An Object–Oriented Methodology for End–User Logical Database Design:" Higa et al., IEEE 1989, pp. 365–373.

"Serializability in Object–Oriented Database Systems" Rakow et al., IEEE Feb. 1990, pp. 112–120.

Chisato Konno, et al., "Advanced Implicit Solution Function of DEQSOL and its Evaluation", Proceedings of the Fall Joint Computer Conference, IEEE Computer Society Reprint, 1986, pp. 1026–1033.

H. I. Rosten and D. Brian Spalding, "Phoenics–Beginner's Guide and User Manual", CHAM TR/100, 1986, pp. 24–37.

*Primary Examiner*—Partshotam S. Lall
*Assistant Examiner*—Viet Vu
*Attorney, Agent, or Firm*—Fay, Sharpe, Beall, Fagan, Minnich & McKee

[57] ABSTRACT

Guidances are provided for database retrieval in a numerical simulation system. A user can execute numerical simulation without knowledge of mathematical and numerical techniques. A physical model is generated using information of a region shape, material name, physical phenomenon name, boundary condition name, and the like, respectively inputted by a user. A mathematical model generating step calculates physical characteristic values from the physical model, and in accordance with the physical characteristic values, retrieves proper equations from an equation database. A calculation model generating step detects mathematical characteristic values from the equations to retrieve proper numerical algorithms for solving the equations from an algorithm database. A simulation information generating step retrieves from a package database a simulation package for solving the given physical problem by using the selected algorithms, and generates simulation information for the retrieved package.

7 Claims, 35 Drawing Sheets

FIG. 5

| EQUATIONS AND CONSTANTS | BOUNDARY CONDITIONS | TIME-EXPANSION ALGORITHM | LINEARIZATION ALGORITHM | LINEAR CALCULATION ALGORITHM |
|---|---|---|---|---|
| $dt(\rho v) = -div(X..\rho v)$ $-grad(p)+div(A..grad\ v)$ $div(v)=0$ AT AIR | v=0.2 AT INLET v=0 AT STATIC WALL | SMAC | — | ILUCG |
| $dt(\rho cT) = -div(v\rho cT)$ $+div(L..grad(T))$ AT AIR, COPPER CERAMIC | T=20 AT ADIABATIC WALL | EXPLICIT METHOD | — | — |

350

MESH (SPACE STEP) : dx < 0.5 (m)

TIME STEP : dt = 0.02 (sec)

FIG. 6

21  SUMULATION INFORMATION   360

```
CONSTANTS, TIME STEP   CONST  R=0.0085, M=0.65, DT=0.02;        361
VARIABLES              VAR    VV=(U,V),UM,VM,Uo,Vo,P,Po,T,To;   362
BOUNDARY               BCOND  U=0.2 V=0.0 AT INLET,
CONDITIONS                    U=0.0 V=0.0 AT STATIC WALL,
                              N(A..GRAD(VV))=0 AT OUTLET,
                              T=20.0 AT INLET,
                              N(L..GRAD(T))=0 AT BOTTOM+OUTLET;
CALCULATION            SCHEME;
BLOCK                    ITER NT UNTIL T EQ 20.0              363
                           UM=Uo-DT*(DX(U*U)+DY(U*V)+DX(Po)-DIV(A..GRAD(U)));
                           VM=Vo-DT*(DX(U*V)+DY(V*V)+DY(Po)-DIV(A..GRAD(V)));
                           SOLVE PHI OF LAPL(PHI)=-DX(U)-DY(V) BY ILUCG;
                           U=UM-DX(PHI); V=VM-DY(PHI); P=Po-R*PHI/DLT;
                           T=To-DT*(DX(U*T)+DY(V*T)-DIV(L..GRAD(T)));
                         END ITER;
                       END SCHEME;
MESH                   NODE   1   0.0   0.0                    364
                              2   0.5   0.0
                              3   1.0   0.2
                              .....
                       ELEMENT 1   5   7  10   4               365
                               2   7   8  10  12
                               3   8  10  15  16
                              .....
```

10 PROCESS FOR GENERATING PHYSICAL MODEL

F I G. 27
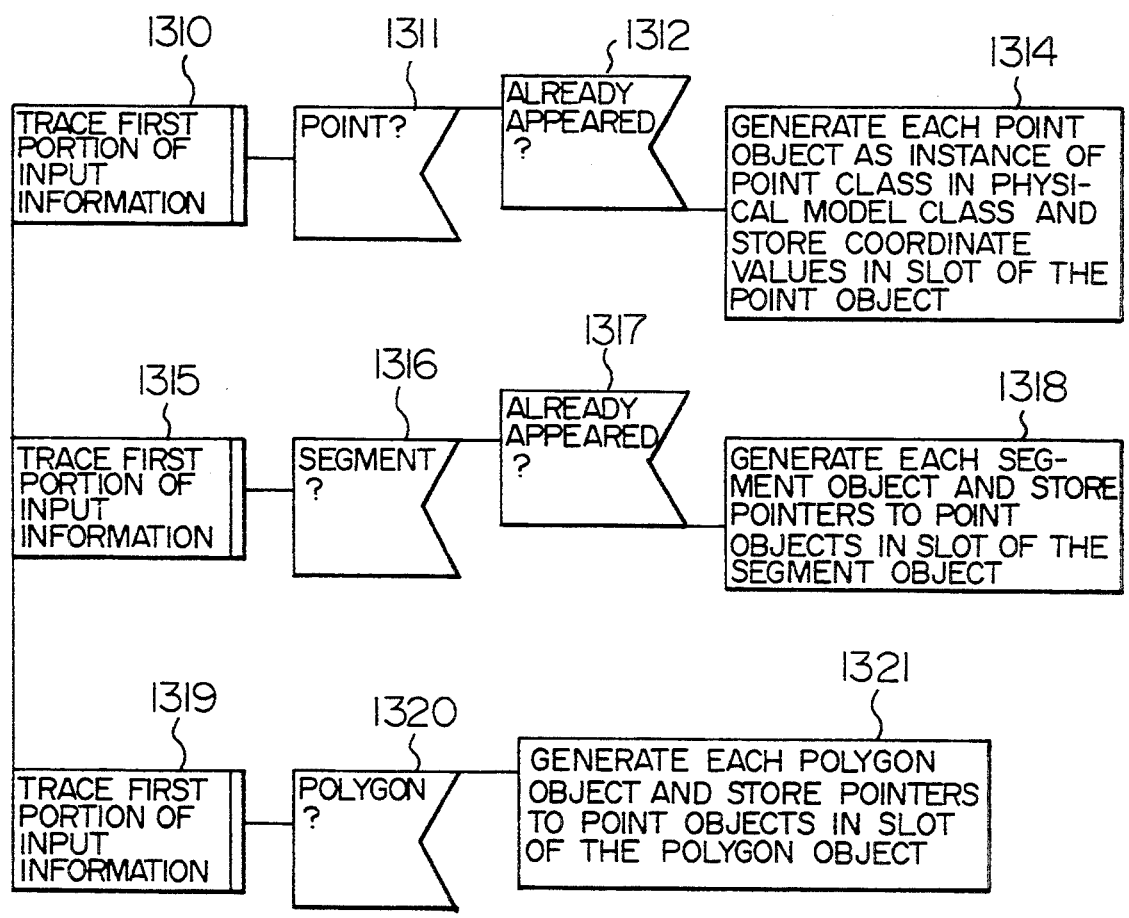

F I G. 28
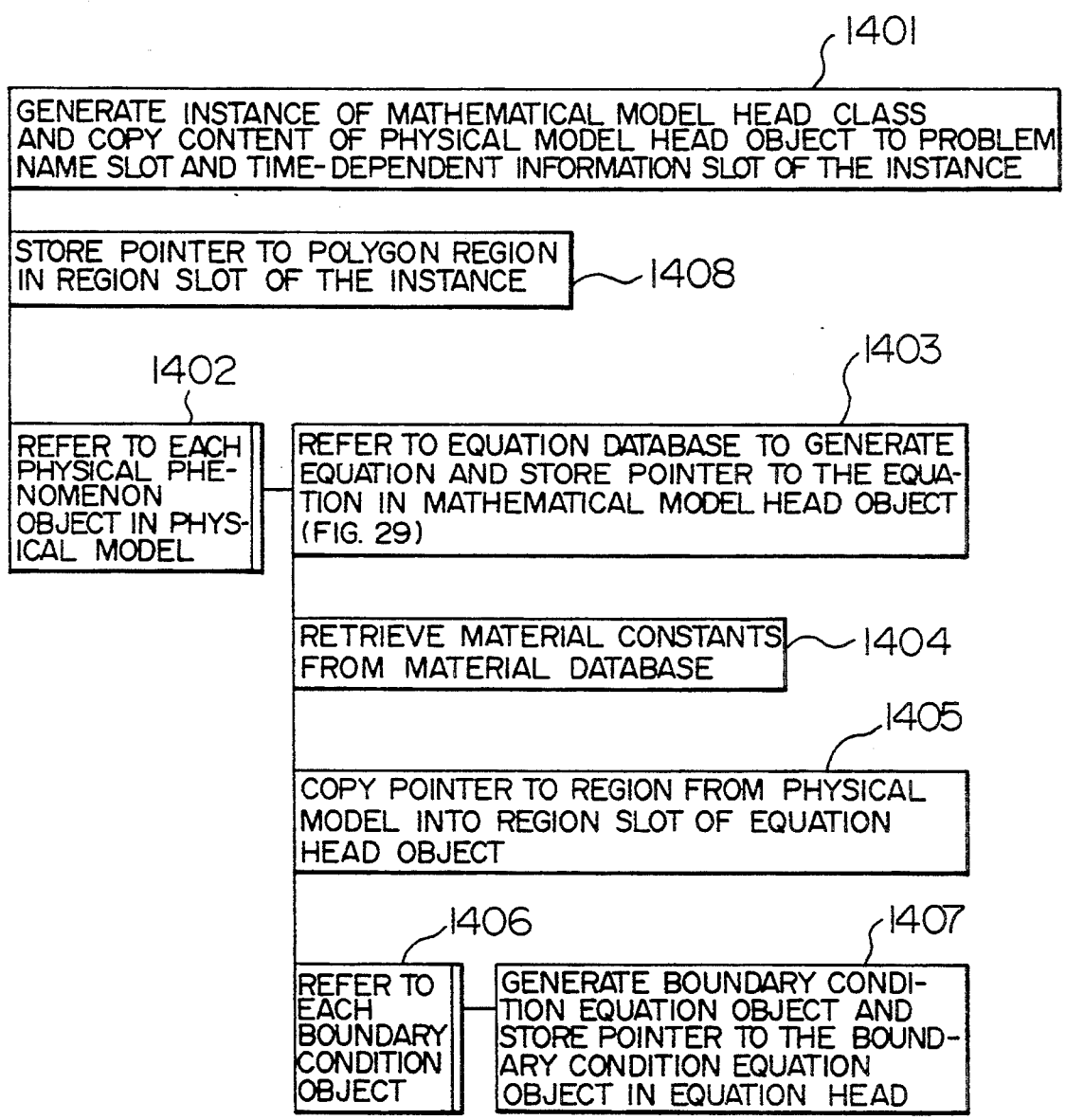

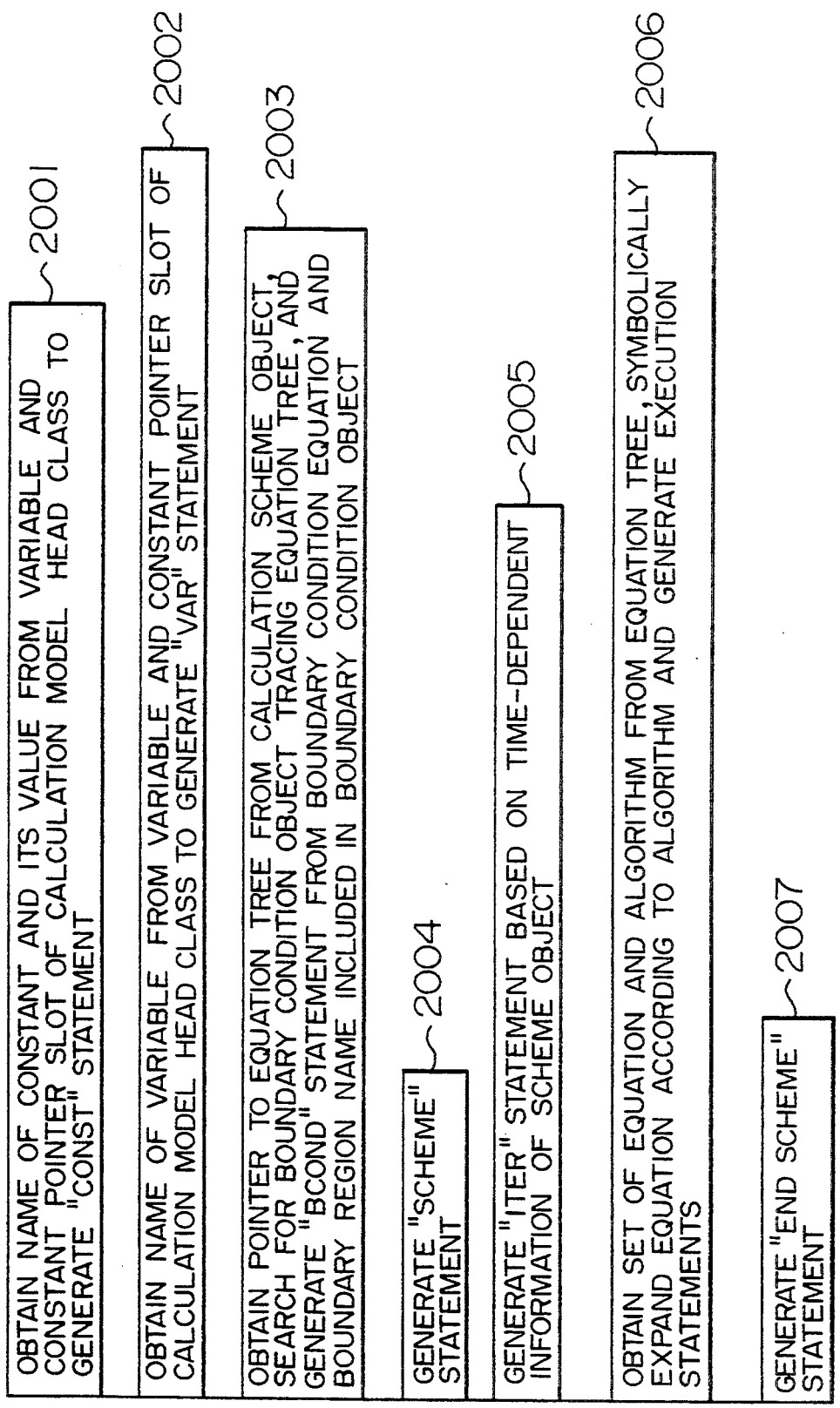

FIG. 37

20 PROCESS FOR GENERATING SIMULATION INFORMATION (2nd)

- 2001 OBTAIN NAME OF CONSTANT AND ITS VALUE FROM VARIABLE AND CONSTANT POINTER SLOT OF CALCULATION MODEL HEAD CLASS TO GENERATE "CONST" STATEMENT
- 2002 OBTAIN NAME OF VARIABLE FROM VARIABLE AND CONSTANT POINTER SLOT OF CALCULATION MODEL HEAD CLASS TO GENERATE "VAR" STATEMENT
- 2003 OBTAIN POINTER TO EQUATION TREE FROM CALCULATION SCHEME OBJECT, SEARCH FOR BOUNDARY CONDITION OBJECT TRACING EQUATION TREE, AND GENERATE "BCOND" STATEMENT FROM BOUNDARY CONDITION EQUATION AND BOUNDARY REGION NAME INCLUDED IN BOUNDARY CONDITION OBJECT
- 2004 GENERATE "SCHEME" STATEMENT
- 2005 GENERATE "ITER" STATEMENT BASED ON TIME-DEPENDENT INFORMATION OF SCHEME OBJECT
- 2006 OBTAIN SET OF EQUATION AND ALGORITHM FROM EQUATION TREE, SYMBOLICALLY EXPAND EQUATION ACCORDING TO ALGORITHM AND GENERATE EXECUTION STATEMENTS
- 2007 GENERATE "END SCHEME" STATEMENT

FIG. 39

| FIELD | INDEX AND DIRECTING METHOD 3906 3901 | | | |
|---|---|---|---|---|
| | REYNOLDS NUMBER | GRASHOF NUMBER | COMPRESSIBILITY COEFFICIENT 3905 | TIME DEPENDENCY 3907 |
| FLUID | $UL/m$ 3904 3908 3909 | $g\beta\Delta T L^3/m^2$ | $u/Sv$ | DESIGNATION BY USER |
| | PECLET NUMBER | HEAT SOURCE | TIME DEPENDENCY 3913 | |
| HEAT CONDUCTION | 3911 $UL\rho c/\kappa$ | 3912 $q$ | DESIGNATION BY USER | |
| STRUCTURE | | | | |

3902

3903

$U$: REPRESENTATIVE VELOCITY, $L$: REPRESENTATIVE LENGTH
$g$: GRAVITATIONAL ACCELERATION, $\beta$: EXPANSION COEFFICIENT
$m$: VISCOSITY COEFFICIENT, $T$: TEMPERATURE
$v$: FLUID VELOCITY, $\kappa$: HEAT CONDUCTIVITY, $q$: HEAT RATE
$Sv$: SOUND VELOCITY, $\rho$: DENSITY

FIG. 40

| FIELD | INDEX | EQUATION NAME | EQUATION | BOUNDARY CONDITION NAME | BOUNDARY CONDITION EQUATION |
|---|---|---|---|---|---|
| FLUID | REYNOLDS NUMBER <0.1<br>GRASHOF NUMBER = 0<br>COMPRESSIBILITY COEFFICIENT <0.1<br>TIME DEPENDENCY NON | LINEAR STOKES FLOW | $-\text{grad}(p)+\text{div}(\mu\cdot\text{grad}(V))=0$<br>$\text{div}(V)=0$ | STATIC WALL | $V=0$ |
| | | | | INLET | $V=\text{DESIGNATED VALUE}$ |
| | | | | OUTLET FREE-SURFACE | $n(\mu\cdot\text{grad}(V))=0$ |
| | 2000 > REYNOLDS NUMBER > 0.1<br>GRASHOF NUMBER = 0<br>COMPRESSIBILITY COEFFICIENT <0.1<br>TIME DEPENDENCY NON | NON-COMPRESSIBLE LAMINER FLOW | $-V\cdot\text{grad}(V)-\text{grad}(p)$<br>$+\text{div}(\mu\cdot\text{grad}(V))=0$<br>$\text{div}(V)=0$ | STATIC WALL | $V=0$ |
| | | | | INLET | $V=\text{DESIGNATED VALUE}$ |
| | | | | OUTPUT FREE-SURFACE | $n(\mu\cdot\text{grad}(V))=0$ |
| | 10 > REYNOLDS NUMBER > 0.1<br>GRASHOF NUMBER = 0<br>COMPRESSIBILITY COEFFICIENT <0.1<br>TIME DEPENDENCY NON | NON-COMPRESSIBLE LAMINER FLOW WITH NATURAL CONVECTION | $-V\cdot\text{grad}(V)-\text{grad}(p)$<br>$+\text{div}(\mu\cdot\text{grad}(V))+\beta\cdot(T-T0)=0$<br>$\text{div}(V)=0$ | STATIC WALL | $V=0$ |
| | | | | INLET | $V=\text{DESIGNATED VALUE}$ |
| | | | | OUTPUT FREE-SURFACE | $n(\mu\cdot\text{grad}(V))=0$ |
| | ----- | ----- | ----- | ----- | ----- |
| HEAT CONDUC-TION | | | | | |

FIG. 41A

| INDEX (4100) | SYMMETRY (4101) | NON-LINEARITY (4102) | TIME DEPENDENCY (4103) |
|---|---|---|---|
| DIRECTING METHOD (4104) | PRESENCE OF 1st ORDER DERIVATIVE WITH RESPECT TO SPACE | | PRESENCE/ABSENCE OF TERM OF DERIVATIVE WITH RESPECT TO TIME (4106) |
| INDEX VALUE (4111) | SYMMETRIC, ASYMMETRIC (4107) | LINEAR NON-LINEAR (4105/4108) | STEADY, TRANSIENT (4109) |

FIG. 41B

| KIND OF ALGORITHM (4150) | INDEX (4151) | (4152) | ALGORITHM (4153) |
|---|---|---|---|
| TIME-EXPANSION ALGORITHM (4165) | TIME DEPENDENCY: STEADY | | — (4155) |
| | TIME DEPENDENCY: TRANSIENT (4154) | | EXPLICIT METHOD CRANK-NICHOLSON METHOD SMAC METHOD BATCH IMPLICIT METHOD |
| LINEARIZ- ATION ALGORITHM (4106) | NON-LINEARITY: LINEAR | | — (4158) |
| | NON-LINEARITY: NON-LINEAR (4156) | TIME-EXPANSION ALGORITHM IS OTHER THAN NEWTON-RAPHSON METHOD (4157) | SUCCESSIVE ASSIGNMENT METHOD NEWTON-RAPHSON METHOD |
| LINEAR CALCULATION (4107) | SYMMETRY: SYMMETRIC | | ICCG METHOD |
| | SYMMETRY: ASYMMETRIC (4159) | LINEARIZATION ALGORITHM IS NEWTON-RAPHSON METHOD (4160) | BCG METHOD GAUSS ELIMINATION METHOD (4161) |

METHOD OF GENERATING PARTIAL DIFFERENTIAL EQUATIONS FOR SIMULATION, SIMULATION METHOD, AND METHOD OF GENERATING SIMULATION PROGRAMS

BACKGROUND OF THE INVENTION

1. Industrial Field of the Invention

The present invention relates to a method of executing numerical simulation for simulating a physical phenomenon such as heat, fluid, physical structure, and electro-magnetic field by a computer. More particularly the present invention relates to a method of executing numerical simulation capable of reducing the number of simulation steps with simpler inputs to be designated.

2. Description of the Related Art

Numerical simulation is widely used in industrial fields as a method of simulating a physical phenomenon such as heat conduction, fluid flow and physical structure by using a computer. By using numerical simulation, it is possible to reproduce and observe a physical phenomenon and determine design parameters, without actual experiments using a model and apparatus. It can be expected therefore that design time and cost can be reduced considerably.

The principle of numerical simulation is to numerically solve equations describing a physical phenomenon by a computer. Such equations are generally ordinary differential equations and partial differential equations. As a means for numerically solving such equations, there are known the finite element method, the finite difference method and the like. In each of these methods, a number of representative points (nodes or grid points) are arranged within a region to be analyzed in which a subject physical phenomenon occurs, and the physical quantities such as temperature and fluid velocity continuously changing in the region are represented by sets of values at these nodes. An original differential equation is replaced by a set of linear equations representing values at these nodes. Such replacement of continuously changing values by a finite number of values at nodes, is called "discretization", and a set of nodes is called a "mesh". In order to analyze a phenomenon changing with time, it is necessary to calculate equations at the interval of time step, irrespective of continuously changing time.

In order to execute numerical simulation by a computer, it is necessary to provide a program which instructs the computer the detailed algorithms of simulation, involving a good understanding of mathematical and programming techniques. In view of this, in many cases most users obtain a commercially available program and input thereto necessary data and instructions to execute numerical simulation. A program of this type is called a numerical simulation package. There are two types of such a package. In one type, a numerical simulation program is automatically generated upon input of differential equations, boundary conditions and the like. This type is called hereinafter a variable-equation type simulation package. The variable-equation type package has the advantage that different types of problems can be dealt with by inputting different differential equations or combinations of such different differential equations. However, it requires programming and discretization knowledge in order for a user to become an expert. An example of the variable-equation type package is disclosed in C. Konno, et al. "Advanced Implicit Solution Function of DEQSOL and its Evaluation", Proceedings of the Fall Joint Computer Conference, pp. 1026 to 1033, (1986). In the other type, a physical phenomenon which can be analyzed (i.e., differential equations to be solved) is fixedly determined, and data specific to the phenomenon is inputted to execute numerical simulation. This type is called a fixed-equation type simulation package. This fixed-equation type package is not required to supply equations. However, since a physical phenomenon to be dealt with is fixed, other physical phenomena or a combined simulation with other physical phenomena cannot be dealt with. Accordingly, a user is requested to select a proper package by checking whether a subject problem is within the range of application fields of the package. An example of the fixed-equation type simulation package is PHONECS of CHAMP Ltd., England. PHONECS is described in detail in PHONECS—beginners's guide and user manual by H. I. Rosten and D. Brian Spalding, CHAM TR/100, 1986, pp. 24 to 37.

A user is required to designate the kind of numerical algorithms (or numerical value calculation procedures), regardless of which type of a simulation package the user selects. Most physical phenomena include time dependency and non-linearity. Various methods are known to process such time dependency and non-linearity for numerical simulation. Accordingly, most simulation packages are structured to allow selective use of such methods. However, a user must determine which one or which combination of the methods is to be used. Furthermore, even after determining proper algorithms, a user must set the arrangement of nodes and a time step in order to execute proper simulation.

Many attempts have been made to provide users with numerical simulation packages easy to use. In U.S. Pat. No. 4,742,473 by Shugar, there is disclosed a method in which a simulation package using the finite element method is provided with a menu-type interface, and attributes (material constants, boundary conditions and the like) are set to nodes or elements on a mesh by using an intelligent cursor on a screen. In JP-A-2-151927 corresponding to U.S. patent application Ser. No. 07/443,252, now U.S. Pat. No. 5,148,379 assigned to the present assignee, there is described a method in which a user refers to guidances and selects a combination of key indices to automatically generate a program for numerical simulation. The structure of guidances is shown in FIG. 11 of its specification. The guidances has a hierarchical structure such that when a user chooses one selection item, the relevant lower level selection items are displayed to urge the user to further choose one of them. For example, a user chooses one of selection items (such as heat conduction, diffusion, and fluid flow) regarding a physical phenomenon name, the selected one corresponding to the physical phenomenon the user wishes to simulate. If a fluid flow is selected, selection items "laminar flow or turbulent flow" and "compressible or incompressible" regarding classification of fluid flow phenomena are displayed for the user. If a laminar flow is selected, then selection items "steady or transient" and "linear or non-linear" regarding a simulation condition of the laminar flow are displayed for the user. Until all indices are determined by the user, displaying selection items and selecting them by the user are repeated. In accordance with a combination of selected key indices (e.g., "fluid flow, laminar flow, transient, and implicit method"), an algorithm database is searched to retrieve numerical algorithms for a problem to the solved.

The technique disclosed in the above-cited U.S. Pat. No. 4,742,473 does not consider how a user selects a simulation package which can deal with a plurality of physical phenomena (i.e., partial differential equations) and numerical algorithms. A user must select equations and numerical algorithms from knowledge the user has.

In the case of the technique disclosed in the above-cited JP-A-2-151927 corresponding to U.S. patent application Ser. No. 07/443,252, a user must select key indices for the kind of physical phenomena and numerical algorithms. The technique does not consider a user who is not accustomed with selecting key indices and has poor mathematical techniques. Therefore, a user is requested to understand the meanings of key indices and its selection method very well.

In the case of the techniques disclosed in the above-cited U.S. Pat. No. 4,742,473 and JP-A-2-151927 corresponding to U.S. patent application Ser. No. 07/443,252, a user must determine the arrangement of nodes and a time step which act an important role in obtaining a correct solution of simulation.

SUMMARY OF THE INVENTION

It is an object of the present invention to provide a numerical simulation method wherein even a user not familiar with numerical simulation can easily execute simulation by inputting data simpler than that described with the above-cited JP-A-2-151927 corresponding to U.S. patent application Ser. No. 07/443,252. Specifically, the present invention aims at generating proper numerical algorithms in accordance with the physical characteristic values of a given problem, determining the arrangement of nodes and a time step suitable for proper simulation using the algorithms, selecting a proper numerical simulation package in accordance with the given problem and algorithms, and generating numerical simulation information for the selected package.

Generating proper numerical algorithms in accordance with the physical characteristic values of a given problem can be achieved by a step of calculating the physical characteristic values of the given problem and selecting differential equations matching the characteristic values from an equation database to generate a mathematical model, and a step of detecting mathematical properties of the selected differential equations, and selecting numerical algorithms matching the properties from an algorithm database to generate a calculation model.

Determining the arrangement of nodes and a time step suitable for proper simulation using the algorithms, can be achieved by the calculation model generating step which calculates the arrangement of nodes and a time step while considering the calculation stability of the generated numerical algorithms.

Selecting a proper numerical simulation package in accordance with the given problem and algorithms can be achieved by the simulation information generating step which retrieves a proper simulation package from a simulation package database in accordance with the physical characteristic values and generated numerical algorithms.

The mathematical model generating step has a function to derive physical characteristic values from a given problem, and using the values as key indices, to retrieve proper equations from the equation database. Therefore, a user can obtain a mathematical representation of the problem without understanding of the meanings of key indices and how the equations are selected.

The calculation model generating step has a function to derive mathematical properties of the selected equations, and using the properties as key indices, to retrieve from the algorithm database combinations of numerical value calculation procedures (time-expansion algorithms, linearization algorithms, linear calculation algorithms) suitable for numerically solving the equations. Therefore, a user can obtain numerical algorithms for the problem without understanding of the meanings of key indices and how the algorithms are selected. The calculation model generating step has also a function to determine the proper arrangement of nodes and a time step while considering the convergence and stability of the generated algorithms. Therefore, a user can obtain mesh data and time step data, for executing simulation without any knowledge specific to the numerical simulation such as convergence and stability.

The simulation information generating step retrieves a proper simulation package from the simulation package database in accordance with the characteristic values of a given problem and the properties of the generated algorithms, and generates numerical simulation information for execution of simulation by using the selected simulation package. The simulation information and mesh data are given to the simulation package. Therefore, a user can execute numerical simulation without any knowledge of numerical simulation and simulation package.

BRIEF DESCRIPTION OF THE DRAWINGS

FIG. 5 is a diagram showing the concept of a calculation model.

FIG. 6 illustrates numerical value simulation information.

FIG. 27 is a flow chart showing the operations to be executed at a shape defining object generating step.

FIG. 28 is a flow chart showing the operations to be executed at a mathematical model generating step.

FIG. 37 is a flow chart showing the operations to be executed at a simulation information generating step.

FIG. 39 illustrates knowledge for deriving physical characteristic values.

FIG. 40 illustrates knowledge regarding equations.

FIGS. 41A and 41B illustrate knowledge regarding mathematical characteristic values and numerical algorithms.

DESCRIPTION OF THE PREFERRED EMBODIMENT

A preferred embodiment of the present invention will be described with reference to the accompanying drawings.

Brief Overview of the Present Invention and its Fundamental Principle

Figure 1:
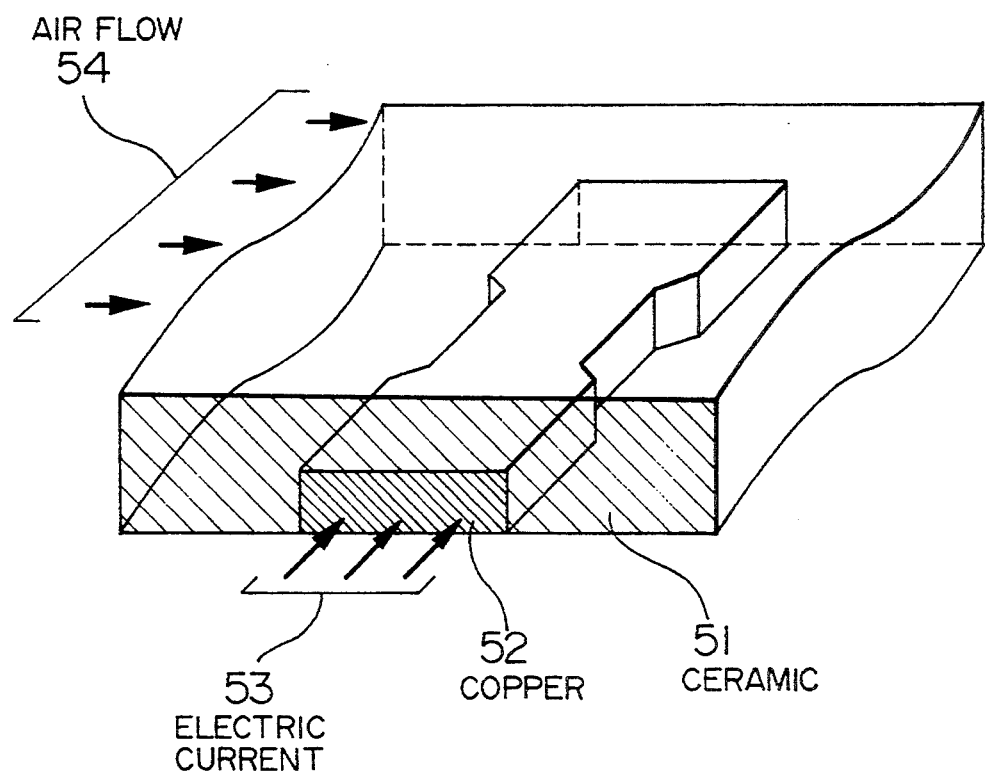
FIG. 1 shows an example of a physical engineering problem.

In FIG. 1, there is illustrated a technical description of a physical engineering problem encountered by an engineer, in this example heat transfer in an electronic device. The electronic device has a copper conductor 52 therein. The copper conductor has a ceramic insulator 51 on three sides, and an air flow 54 passes over the upper side to dissipate heat generated by the conductor 52. This is typical of the type of situation for which partial differential equations are suitable for effectively providing simulation of the physical engineering problem.

Figure 2:
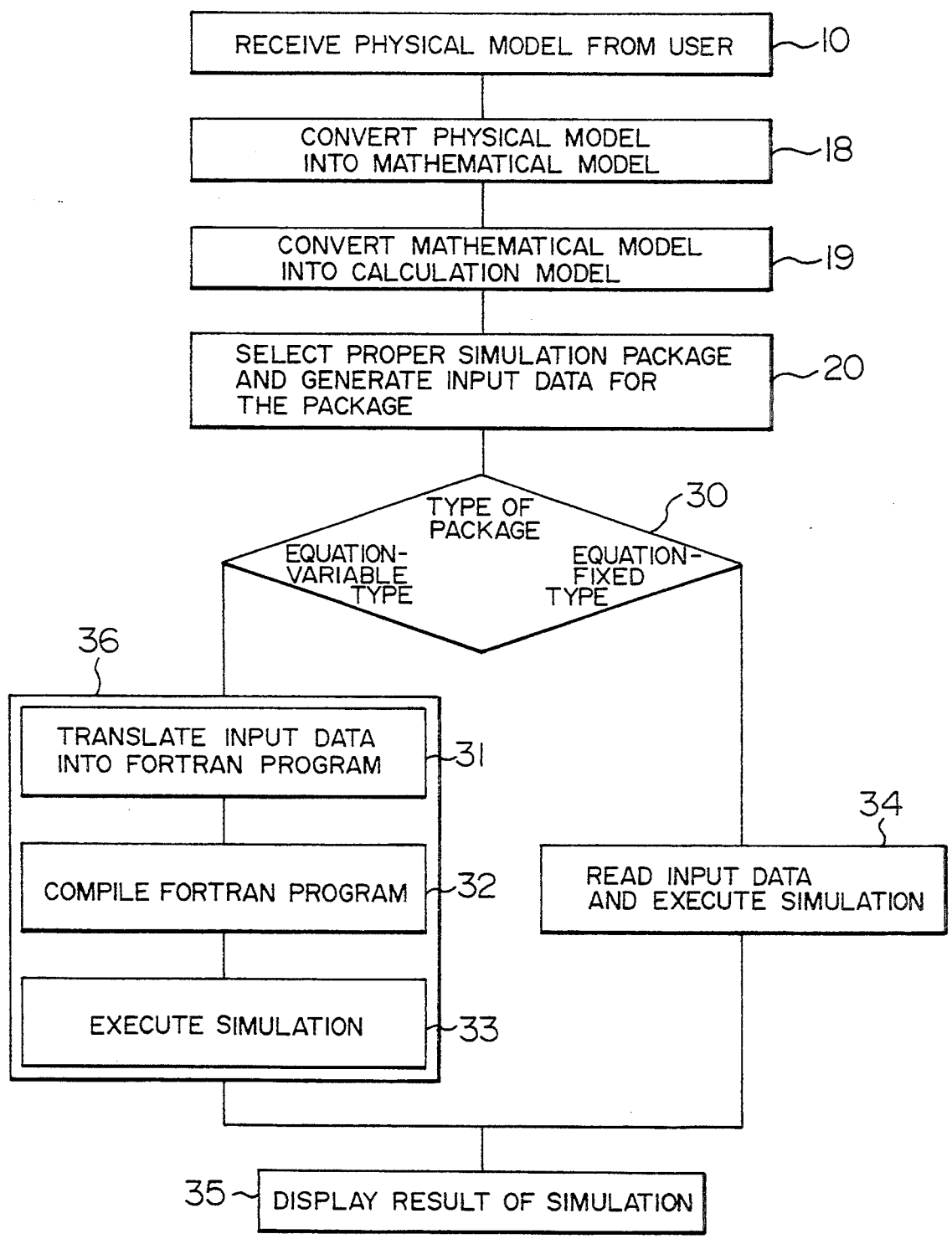
FIG. 2 is a flow chart showing the concept of the present invention.
Figure 3:
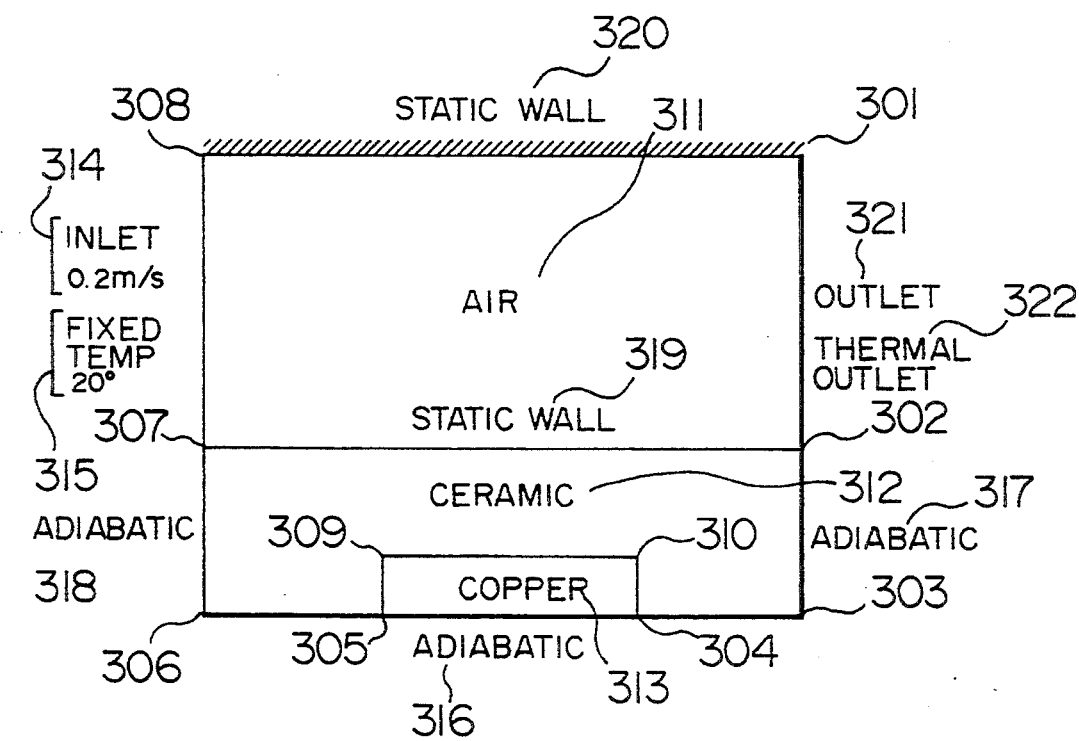
FIG. 3 is a diagram showing the concept of a physical model.

Referring to FIGS. 2 to 6 and FIGS. 39 to 41, the present invention is briefly described taking the above-described physical engineering problem as an example. FIG. 2 shows the procedure of the present invention. In this embodiment, in step 10, the computer system receives at a user interface a model (physical model) precisely defining physical parameters of the problem to be simulated. A representation of a physical model for the problem of FIG. 1 is shown in FIG. 3. The physical model contains region shapes, material names of the regions, physical phenomenon names, boundary conditions, initial conditions, and source effects. In the example shown in FIG. 3, the material names are air 311, ceramic 312 and copper 313. The physical phenomenon names are heat conduction and fluid flow. The heat conduction is defined at all regions 311 to 313, and the fluid flow is defined only at the air region 311. The boundary conditions are defined by fixed temperature 315, adiabatic 316 to 318 and thermal outlet 322 for the heat conduction, and by inlet 314, outlet 321 and static walls 319 and 310 for the fluid flow. Some boundary conditions are assigned values (boundary values) which in this case are the inlet temperature 315 for the fixed temperature condition and the inlet fluid velocity 314 for the fluid flow inlet condition. The source effect is given to each physical phenomenon if necessary. In the example shown in FIG. 3, generation of heat in the copper is defined. The initial states are defined for each physical phenomenon if it is time-dependent. For example, an initial temperature is defined for the heat conduction, and an initial velocity is defined for the fluid flow. If a steady state (final state) only is required, there is no need of providing initial conditions.

Figure 4:
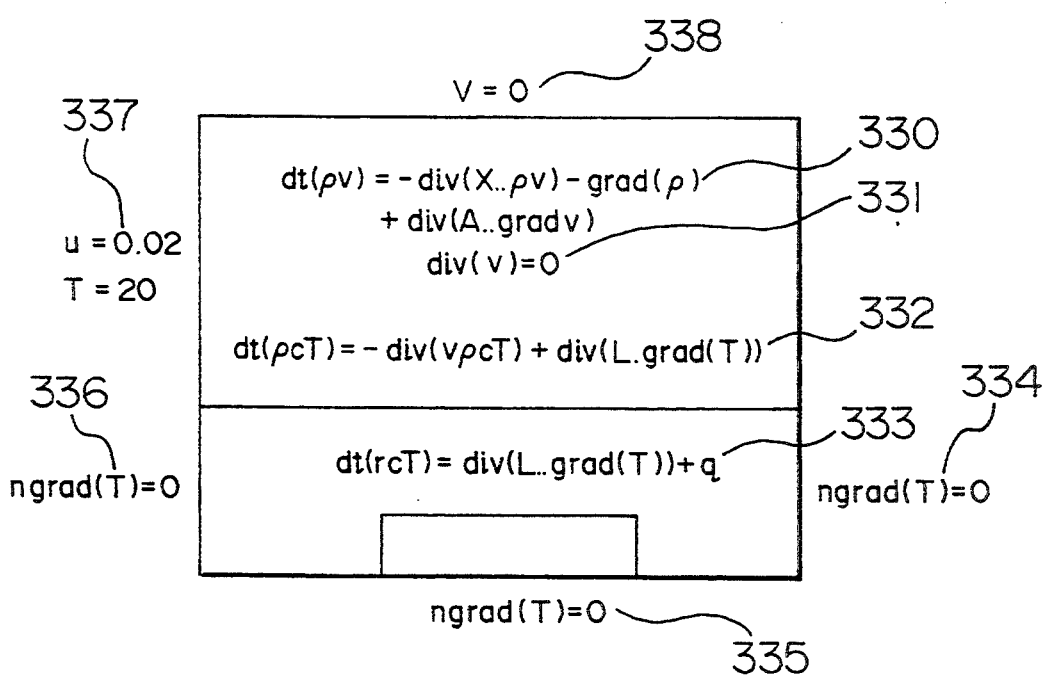
FIG. 4 is a diagram showing the concept of a mathematical model.

In this embodiment, the physical model is then transformed or converted to a mathematical model at step 18 of FIG. 2. An example of the mathematical model is shown in FIG. 4. This consists of a set of partial differential equations 330 to 333, and boundary condition equations 334 to 338. In this example, there are used Navier-Stokes equations 330 and 331 which govern the fluid flow phenomenon at the air region, an advection diffusion equation 332 which governs the heat convection, and a heat diffusion equation 333 which governs the heat conduction at the ceramic and copper regions. As the boundary condition equation, for example, a first kind of boundary condition equation 337 is used which relates to the fluid velocity of the inlet condition. In transforming the physical model to the mathematical model, stored transformation information (knowledge) is used. FIGS. 39 and 40 illustrate such stored information. FIG. 39 show a function group for deriving physical characteristic values of a given problem. Using such functions, there are calculated various characteristic values including a Reynolds number 3904, Grashof number 3905 and compressibility coefficient 3906 for the fluid flow, and a Peclet number 3911 and heat source 3912 for the heat conduction. Parameters in these functions can be estimated from a physical model supplied from a user. For example, a representative length L 3908 required for calculating a Reynolds number can be estimated from the geometrical information of the region, and a representative velocity U can be estimated from an inlet fluid velocity or initial fluid velocity. FIG. 40 illustrates knowledge used for indicating the relation between the physical characteristic values and mathematical representations (partial differential equations). For example, if the function group provides an index indicating that the Grashof number and compressibility coefficient can be neglected within a Reynolds number range from 0.1 to 2000, then from the index column 4001 of FIG. 40 an incompressible laminar flow equation 4008 at the second row can be retrieved as a usable mathematical representation. Furthermore, from a boundary condition name "outlet" a boundary condition equation 4011 can be retrieved. A method of implementing and retrieving such knowledge will be later described in detail.

Next, the mathematical model is transformed to a calculation model at step 19 of FIG. 2. The calculation model includes a set of numerical value calculation procedures (algorithms) for solving partial differential equations of the mathematical model. These numerical value calculation procedures include time-expansion algorithms, linearization algorithms, and linear calculation algorithms. A time step and spatial mesh are determined from the calculation model, while considering the stability conditions of the calculation procedures. Generally a plurality of calculation models are possible, some having good speed but poor precision, others having good precision but large memory capacity, leaving trade-offs therebetween. In this embodiment, an optimum calculation model is selected from a plurality of calculation models in accordance with a predetermined parameter (e.g., calculation speed). Alternatively, some calculation models and their characteristics are presented to a user for selecting one of them. FIG. 5 shows an example of a calculation model of the technical engineering problem shown in FIG. 1. Transformation to such a calculation model is performed also by using knowledge of the present embodiment. FIG. 41A illustrates how a characteristic index of a mathematical model is derived from partial differential equations. An index to be derived includes equation symmetricity 4101, linearity 4102 and time-dependency 4103. These characteristics are derived mainly by detecting a character string (symbolic) pattern of partial differential equations. FIG. 41B illustrates knowledge used for indicating the relation between mathematical characteristic values and numerical value calculation procedures. Using the derived mathematical characteristic value as an index, the types of numerical value calculation procedures can be retrieved from the index string 4151 of FIG. 41B. A time-expansion algorithm, linearization algorithm and linear calculation algorithm are not selected independently from each other, but one selection may influence another. For example, a successive assignment method 4158 of the linearization algorithm can be selected only when a method except for an explicit method of the time-expansion algorithm is selected. This relation is shown at the constraint condition column 4152. A method of implementing and retrieving these kinds of knowledge will be later described in detail.

After selecting a calculation model, a simulation package capable of solving the given problem by using the calculation model is retrieved from a database at step 20 of FIG. 2. The calculation model is converted to input data for the retrieved package. FIG. 6 shows an example of simulation information used when a variable-equation type simulation package 36 is selected. The flow from step 31 to step 33 is executed to provide numerical value by the simulation package using such simulation information. At step 31, the generated data is translated to a FORTRAN program by the variable-equation type simulation package. At steps 32 and 33, the FORTRAN program is executed to obtain numerical results. When a fixed-equation type simulation package 34 is selected, data for the package is generated. Using the data, the fixed-equation type simulation package executes numerical value simulation and obtains numerical results. At step 35 of FIG. 2, the obtained numerical results are displayed via an interface 17. The outline of the procedure of this embodiment has been given above by using a particular example.

Structure of Embodiment

Figure 7:
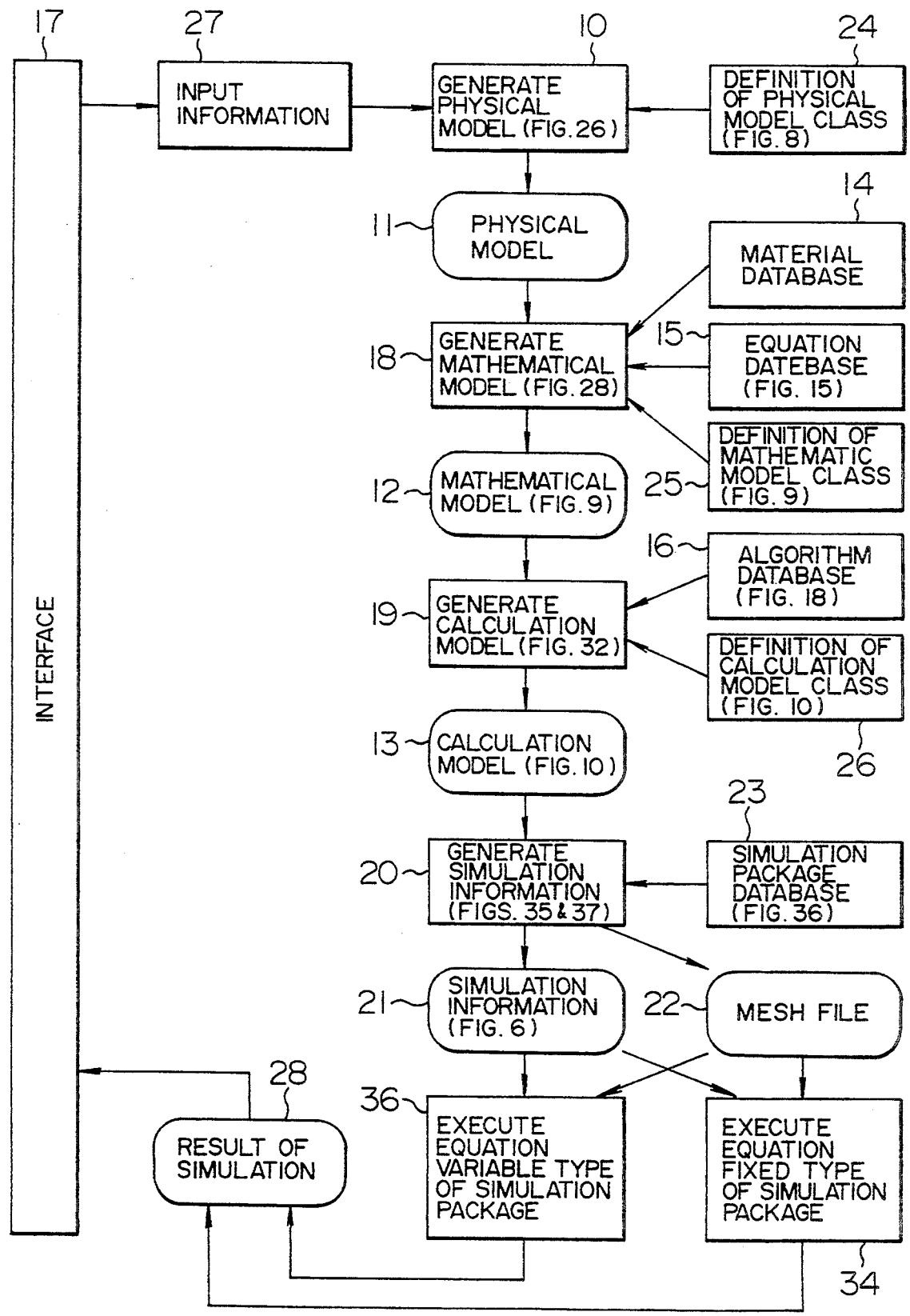
FIG. 7 illustrates the main part of the present invention in block form.
Figure 38:
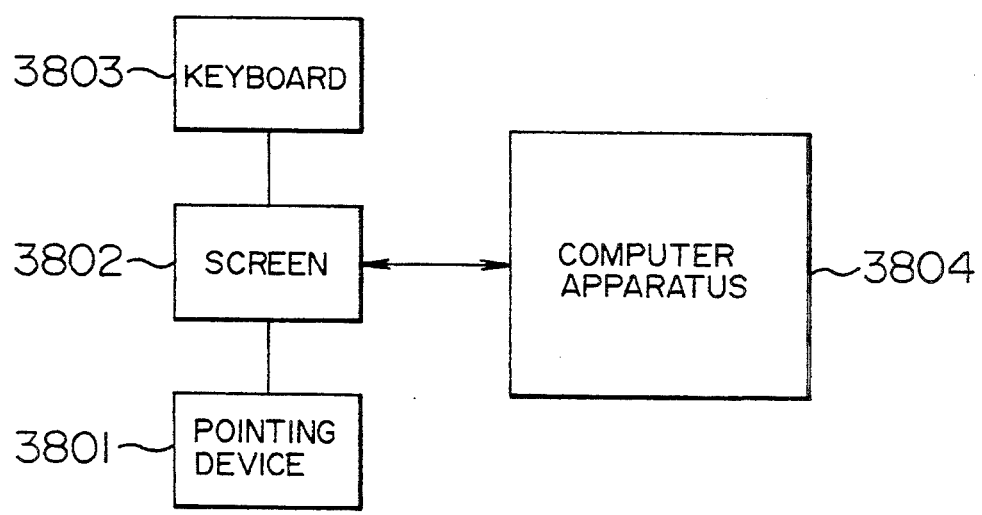
FIG. 38 shows the hardware arrangement of the present invention.

The detailed description of the present embodiment will be given with reference to FIGS. 7 to 38. FIG. 38 shows the structure of hardware necessary for carrying out the present invention. Hardware includes a keyboard 3803 for entering characters and numerals, a screen 3802 for displaying figures and selection items, a pointing device 3801 for designating a point on the screen, and a computer apparatus 3804. There are loaded on the computer apparatus 3804 various procedures and data. Only one computer apparatus 3804 may be used, or two computer apparatuses may be used respectively for executing the simulation package (34 or 36 in FIG. 7) and for executing the other procedures. FIG. 7 shows the flow of procedures and module structure of the embodiment. A user defines a physical model 11 via the interface 17. The physical model is transformed to a mathematical model 12 by a mathematical model generating process 18. This transformation uses a material database 14 and equation database 15. The mathematical model 12 is transformed into several calculation models 13 by a calculation model generation process 19. This transformation uses an algorithm database 16. Lastly, the calculation model is transformed to simulation information 21 and mesh data 22 by a simulation information generation step 20. This transformation refers to a simulation package database 23 to select a proper simulation package for solving the calculation model 13. The generated simulation information 21 and mesh data are sent to the selected variable-equation type 36 or fixed-equation type 34 package to obtain simulation results. The results 28 are sent via the interface 17 to the screen 3802 to display them. Prior to describing the contents of constituent elements shown in FIG. 7, the concept of object oriented paradigm necessary for an understanding of the embodiment will be described first. In accordance with the object oriented paradigm, the main constituent elements are structured, including a physical model 11, mathematical model 12, calculation model 13, equation database 15, algorithm database 16.

Supplemental Description of Object Oriented Paradigm

An object oriented paradigm is one method of forming a computer program. In contrast with a program which is described mainly by procedures and whose data is inputted to and outputted from each procedure, in object-oriented paradigm, a program is described mainly by a set of data, and a procedure for processing data is considered as attributed to the data. Such a data set is called an "object", and a procedure attributed to a data set is called a "method". For example, it is possible to have an object [John, 168 cm, 58 kg] as personal information constructed of a person's name, height and weight. A general program has a number of objects of the same data structure. For example, in the above case, it is necessary to provide objects for as many as the number of persons whose data is to be processed. In such a case, each object is not directly defined for each person, but a data structure common to all persons is first defined. It is convenient to consider that an object for each person is a particular case of such a data structure. The upper level concept of such an object is called a "class", and each object is called an "instance" of the class. A field into which a value such as a name, height and weight is entered is called a "slot". It is possible to define a method of referring to or modifying data contained in a person class. For example, as an index representative of corpulence of a person, an operation (corpulence index: weight+110−height) may be defined as a method. Such a method is effective for all objects belonging to the person class. For example a corpulence index for John can be obtained by "ask John corpulence index". In the object oriented paradigm, it is possible to define a hierarchy between classes. For example, consider an animal class as the higher hierarchic level of the person class. In this case, may be used as one of its slots. In this case, the higher class is called a "super-class", and the lower class is called a "subclass". A hierarchy constructed of such super-classes and sub-classes is called a "conceptual hierarchy" hereinafter. All slots and methods defined for a superclass are effective for all sub-classes. This is called "inheritance". Accordingly, a slot defined for an animal class can be inherited to the person class, and the value of the slot in the object of the person class can be defined and referred to from the John object. The number of arms and legs of a person is four, so a number 4 is assigned as a standard value (default value) of of the person class. The object oriented paradigm has been briefly described above.

Input of Problem via Interface 17

Figure 21:
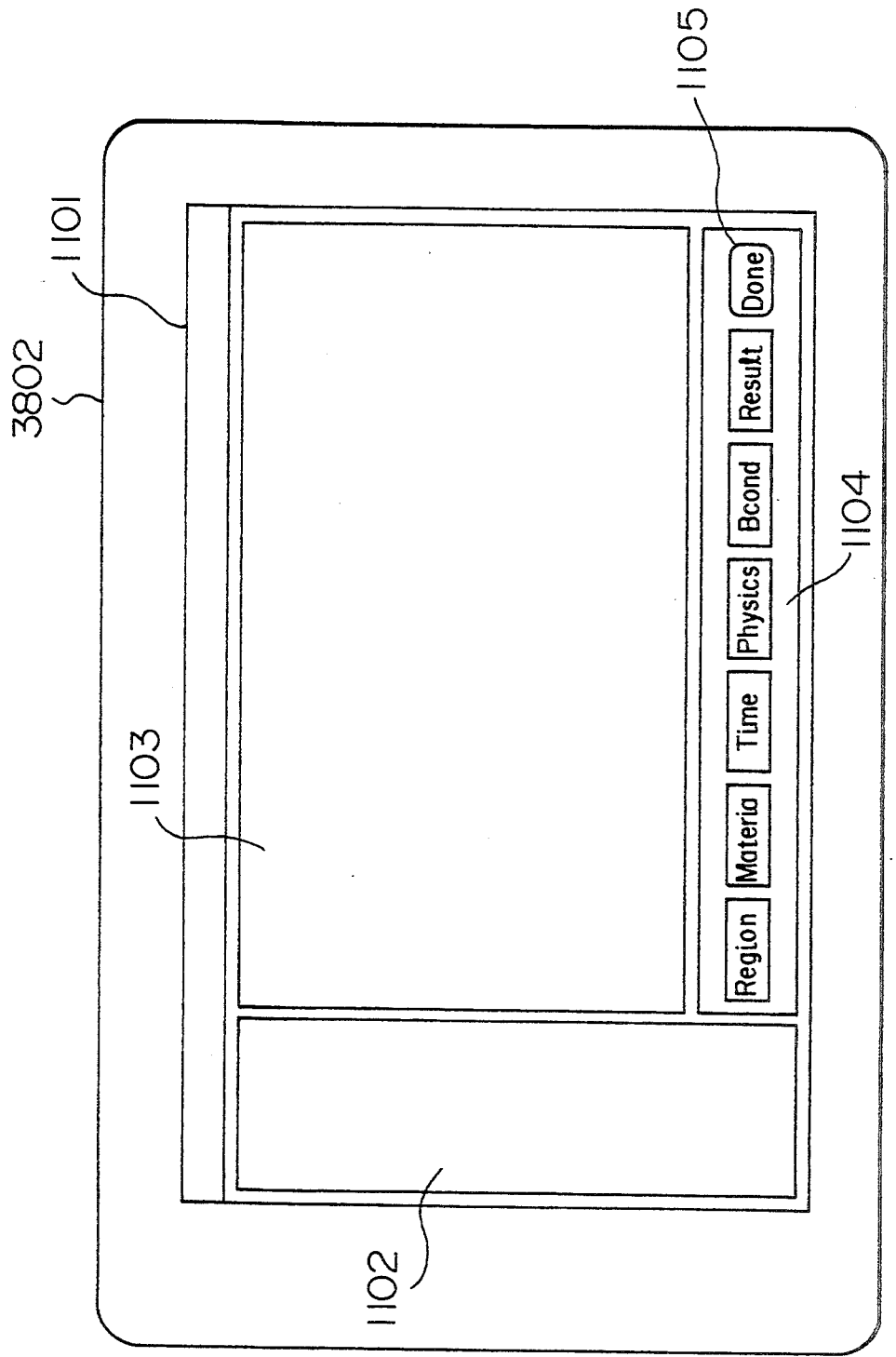
FIG. 21 is a schematic diagram of an interface window.
Figure 22:
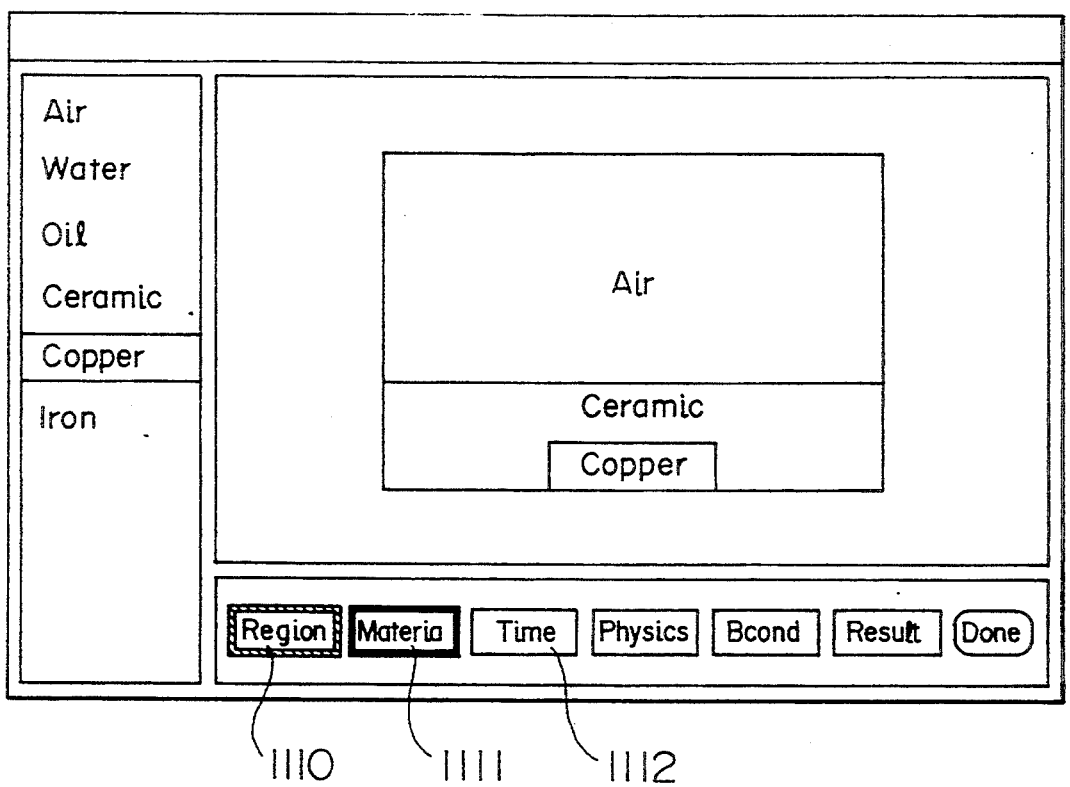
FIG. 22 illustrates an input of material name to the interface window.
Figure 23:
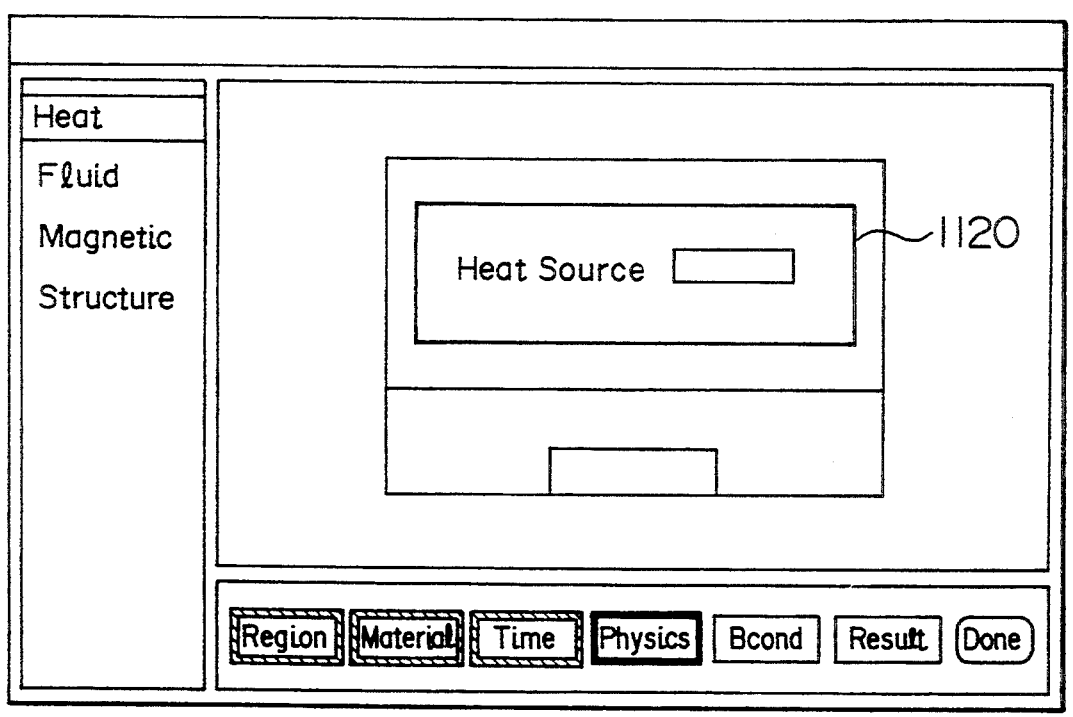
FIG. 23 illustrates an input of physical phenomenon name to the interface window.
Figure 24:
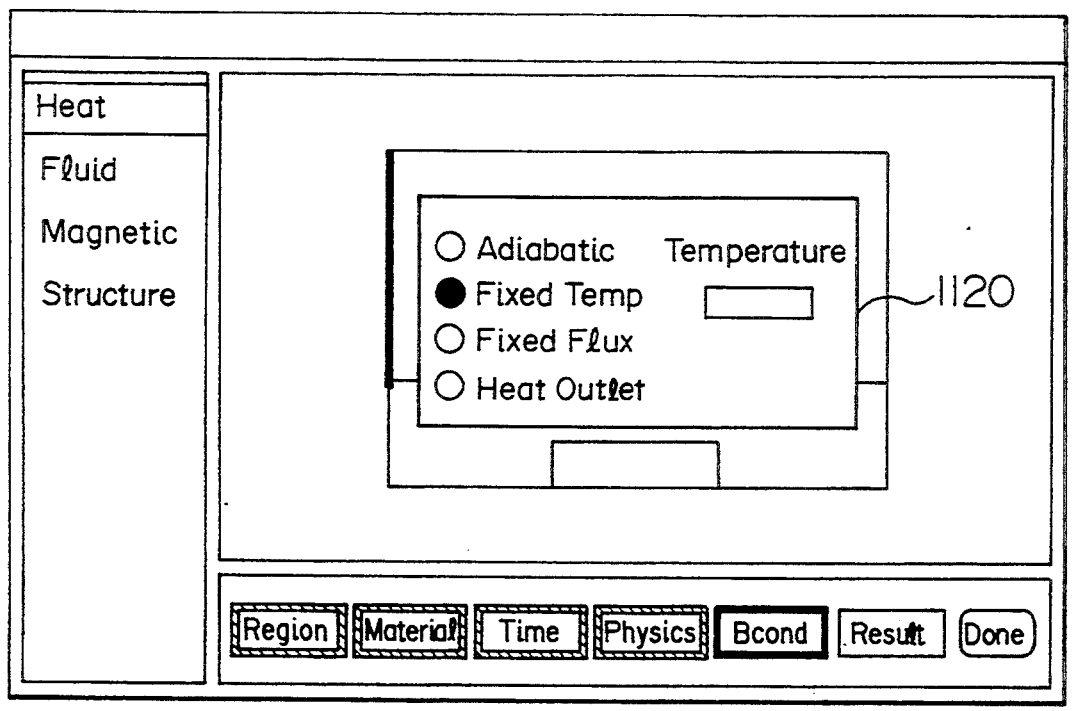
FIG. 24 illustrates an input of boundary condition to the interface window.

Bearing the above-described background technique in mind, the constituent elements of FIG. 7 and their operations will be described. First, the interface 17 receives from a user a definition of a physical engineering problem by using the screen 3802, pointing device 3801 and keyboard 3803. The definition is arranged in the form of input information 27. Examples of problem definition entered in the interface 17 are shown in FIGS. 21 to 24. An interface window 1101 on the screen 3802 has three panes such as shown in FIG. 21. A main pane 1103 is a region a user uses for defining and selecting a shape or figure. An attribute pane 1102 is a region on which selection items are displayed for each scene of a problem definition. A control pane 1104 is a region displaying an operation progress state representative of which part of the physical problem a user is presently defining. A user first defines a region by using the interface window 1101. Defining a region is carried out by drawing straight lines, curves, and combinations thereof, i.e., polygons, by using the pointing device 28. In inputting the shape shown in FIG. 3, the user clicks ten points 301 to 310 on the main pane using the pointing device 28 to fix them (such an operation is stated merely "click" hereinafter). Next, each straight line interconnecting the points is defined by clicking opposite two points of each straight line. Lastly, three polygons 311, 312 and 313 constructed by such straight lines are defined by clicking the sides of each polygon. After defining regions, the user clicks a "Done" button on the control pane. Then, the interface window 1101 proceeds into a material designation state such as shown in FIG. 22. A "Region" box 1110 on the control pane 1104 is surrounded by a gray frame, indicating that region designation was completed. A "Material" box 1111 is then surrounded by a thick black frame, indicating the user is now in a material designation state. In the material designation, a list of material names is displayed on the attribute pane 1102, so the user clicks a proper material name by using the pointing device 28, and also clicks a proper region on the main pane 1103. By repeating the above operations, the material names for all the regions are designated. Then, the interface window 1101 proceeds into a time dependency designation state. In this state, selection items "Steady" and "Transient" are displayed on the attribute pane 1102, so the user selects "Steady" if the user wants to know the final solution, or selects "Transient" if the user wants to know intermediate solutions too. Upon selection of "Transient", the interface 17 opens a dialog box (small window for dialog) on the main pane 1103 to urge the user to enter a simulation start time, end time and time interval for observing the simulation result. After entering such information as described above, the user clicks the "Done" button 1105. Then, the interface window 1101 proceeds into the physical phenomenon name designation state. A list of physical phenomenon names is displayed on the attribute pane 1102. The user clicks an interested physical phenomenon and then clicks the region within which the physical phenomenon takes place to thus complete designation of the physical phenomenon. When the physical phenomenon is designated, the interface 17 opens a dialog box 1120 such as shown in FIG. 23 to urge the user to input supplemental information to the physical phenomenon. The supplemental information includes information of the source effect and the initial condition of a problem regarding time dependency. Two or more physical phenomena may be designated superposed one upon another within one region. In the case of FIG. 3, a fluid flow phenomenon and heat conduction phenomenon are designated superposed one upon the other within the air flow region. After designating a necessary number of physical phenomena, the user clicks the "Done" button. Then, the interface window 1101 proceeds into a boundary condition designation state as shown in FIG. 24. A list of physical phenomenon names continue to be displayed on the attribute pane. When the user clicks the physical phenomenon to which a boundary condition is to be set, the area with the already designated physical phenomenon is highlighted. The user then clicks the border of the highlighted region on the main pane 1103 to select it. Then, there is opened a dialog box 1120 within which selection items for boundary conditions of the selected physical condition are displayed. The user clicks a button of a proper selection item to select the boundary condition. If it is necessary to designate a value (boundary value) in addition to the boundary condition, in this embodiment the value is requested to be entered at the right side of the dialog box 1120. For example, if a fixed temperature is selected as the boundary condition of heat conduction, the fixed temperature value is requested to be entered. The above operations are repeated for all boundary conditions of all physical phenomena. After designating the boundary conditions, the user clicks the "Done" button. In the above manner, inputting all physical information is completed. In the above description, only the heat conduction and fluid flow have been used as physical phenomena for the simplicity of description. Other physical phenomena such as electro-magnetic field and structural deformation are processed by the interface 17 in the similar manner as above.

Input Information 27

Figure 25:
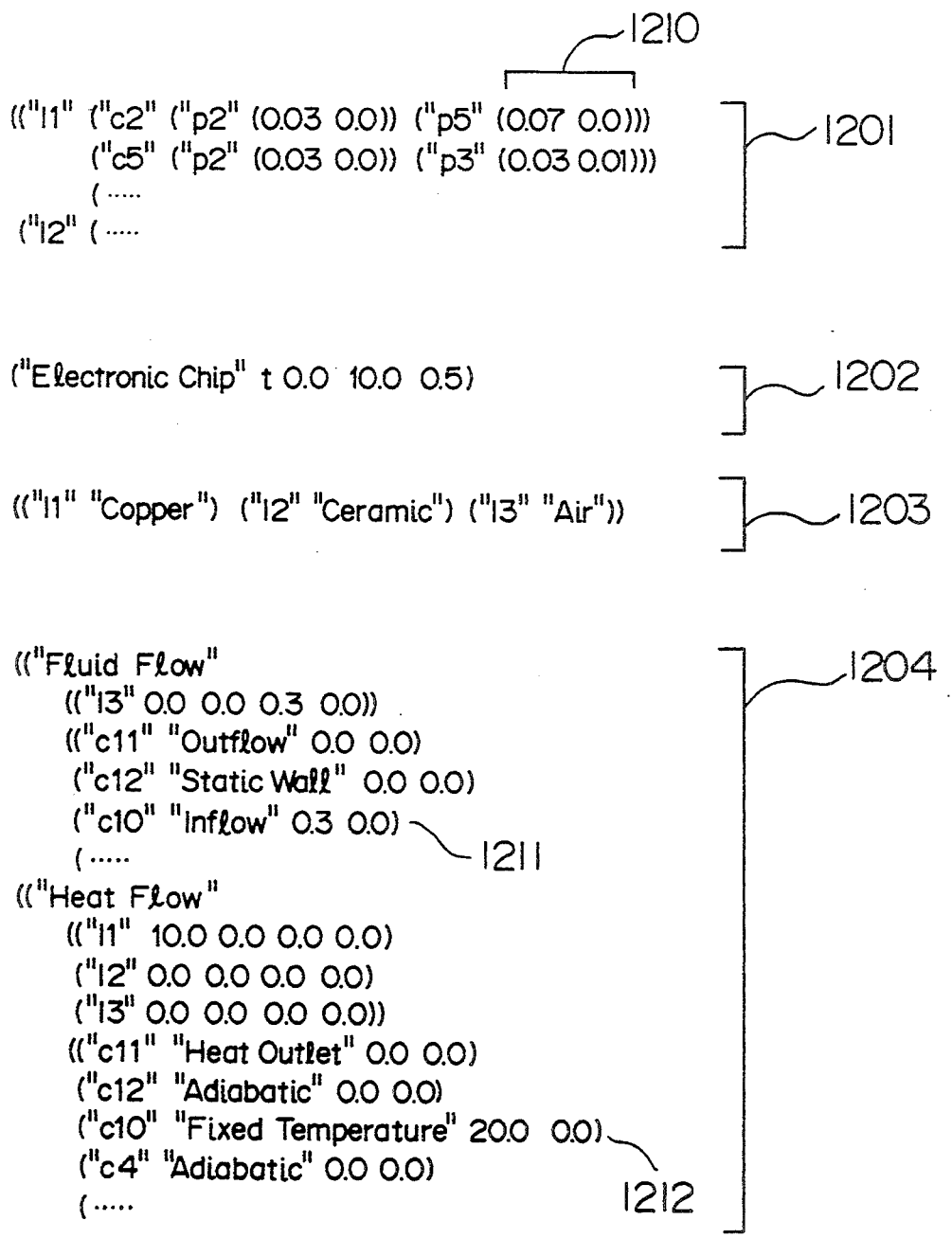
FIG. 25 shows an example of input information.

The interface 17 stores the information entered by the user in the form of input information 27, and sends it to the physical model generating process 10. FIG. 25 shows examples of the input information 27. The input information 27 is stored in four areas 1201 to 1204. The first area 1201 stores information of a region shape. The component or parameter starting from "p" such as "p2" is a point name whose coordinate values are designated by a pair 1210 of two real numbers just after the point name. The component starting from "c" is a name of a line segment which is defined by a combination of points just after the line segment name. The component starting from "l" such as "l1" is a name of a polygon which is defined by a combination of line segments just after the polygon name. The second area 1202 stores the information of a problem name and time dependency. The first parameter is a problem name, and the second parameter indicates time dependence. The problem is time dependent if it is t and steady state if it is nil. The third and following parameters are valid only for the time dependent problem. As the third and following parameters, there are stored a simulation start time (generally 0), end time, and time interval for observation of the simulation result. The third area 1203 stores the information regarding a material name, the information including a polygon name and a material name in the region of the polygon. The fourth area 1204 stores the information of a physical phenomenon and boundary condition. A physical phenomenon name ("Fluid Flow" for fluid) is stored as the first parameter, and immediately thereafter there is stored a combination of the region name for the designated physical phenomenon and supplemental information (source value and x- and y- components of an initial value). After these parameters, there is stored a combination of a border line segment name, boundary condition name, and x- and y-components of the boundary value. For example, an object 1211 indicates that the boundary condition on the border line segment "c10" is "Inflow" (i.e., fluid inlet) and the x-component of a fluid velocity at the inlet is 0.3, and y-component is 0. Similarly, an object 1212 indicates that the boundary condition on the border line "c10" is "Fixed Temperature" and the temperature is 20.0 degree (0.0 after 20.2 has no particular meaning in this case)

Physical Model Generating Step 10

Figure 8:
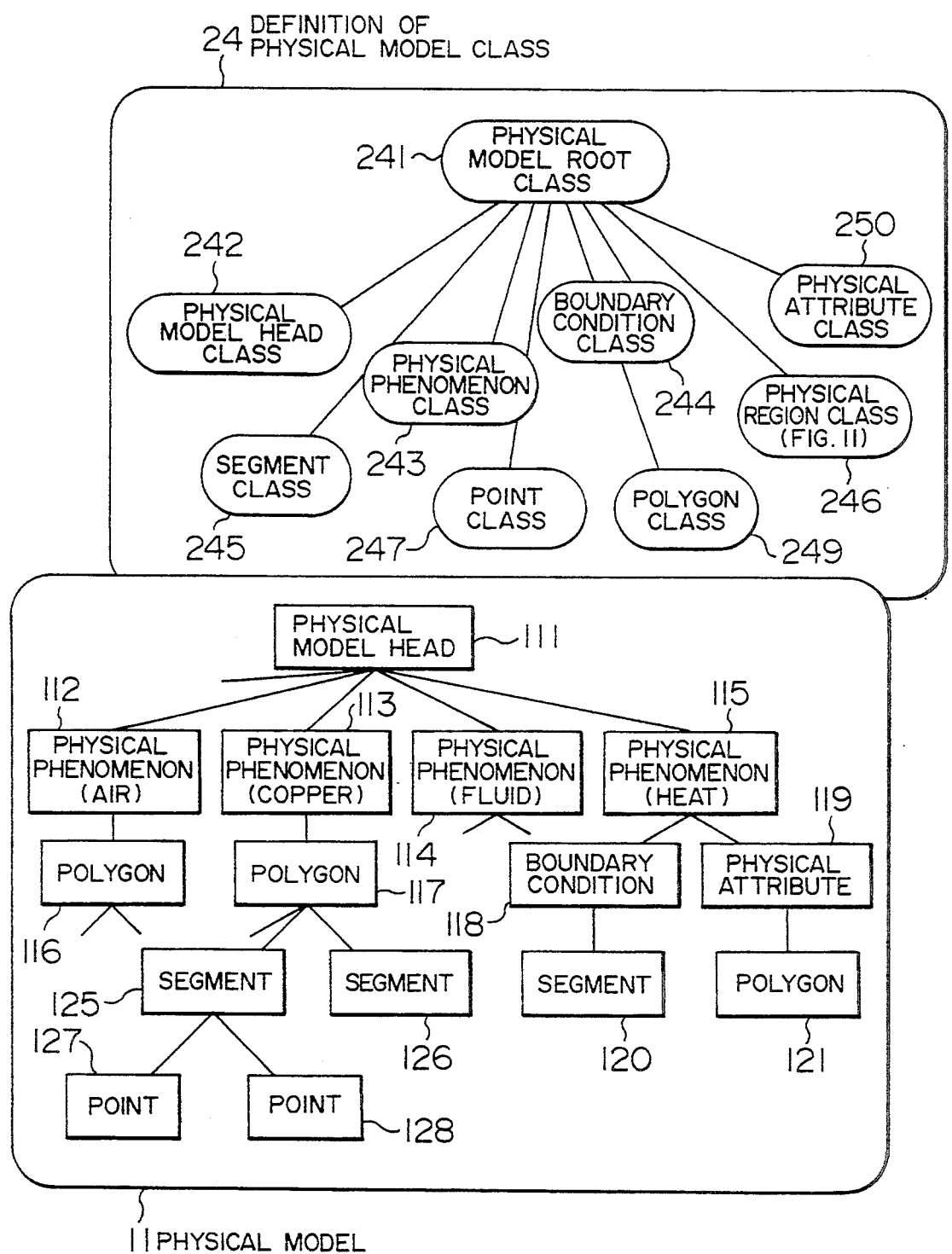
FIG. 8 illustrates a physical model.
Figure 9:
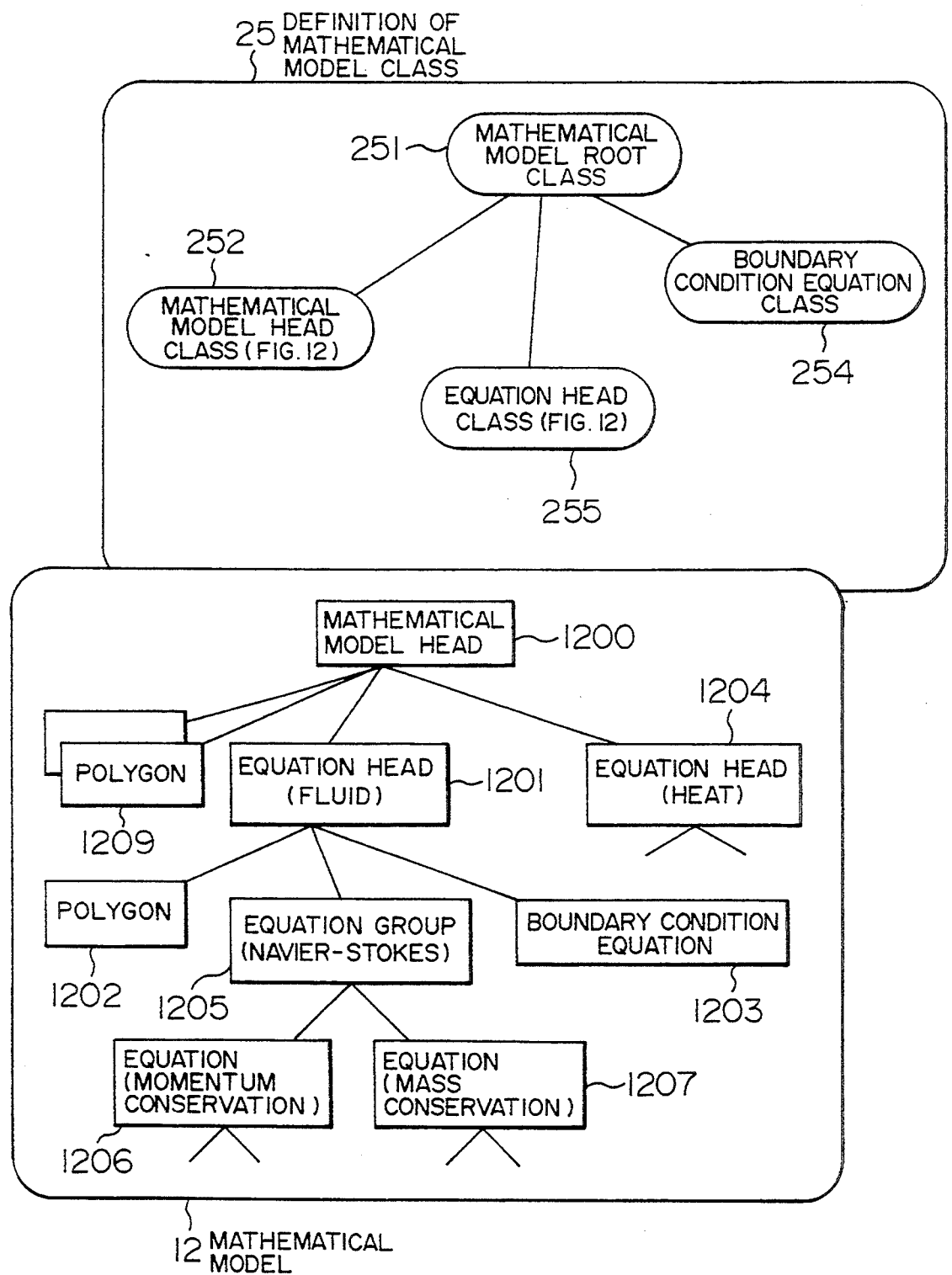
FIG. 9 illustrates a mathematical model.
Figure 11:
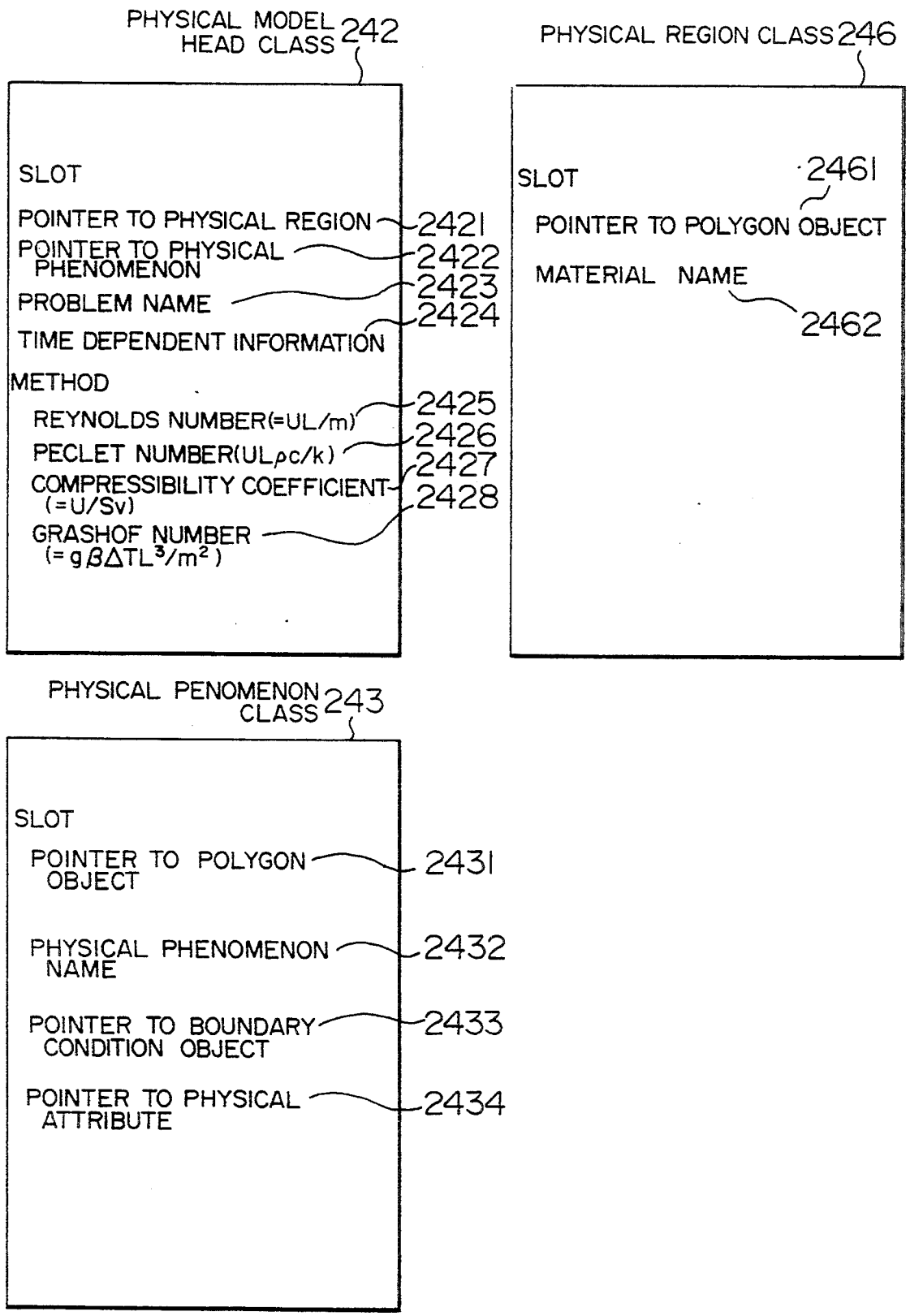
FIG. 11 illustrates class definition of a physical model.
Figure 26:
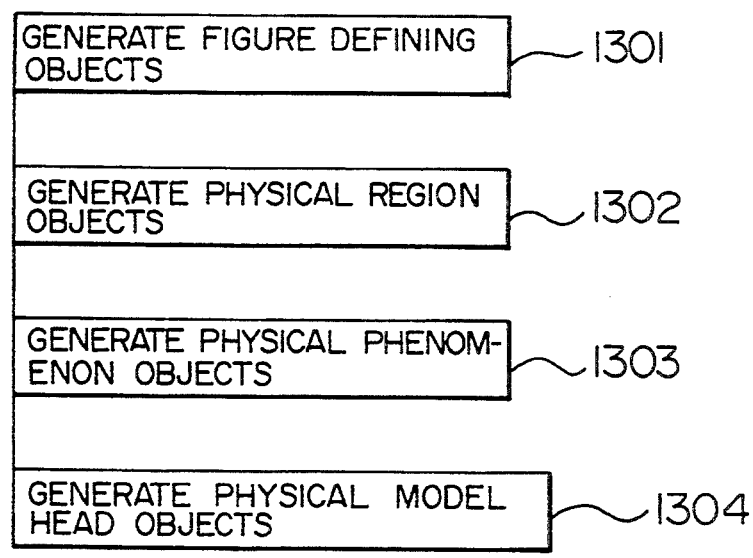
FIG. 26 is a flow chart showing the operations to be executed at a physical model generating step.

The physical model generating step 10 receives the input information 27 from the interface 17, and generates instances corresponding to the input information in accordance with the physical model class definition 24, to thereby generate the physical model 11. The physical model 11 is expressed as a tree which is constructed of objects corresponding to region components and physical phenomena and interconnected by pointers. As shown in FIG. 8, each object constituting the physical model 11 is generated as an instance of the class corresponding to the class definition 24. For example, a physical model head object 111 is an instance of a physical model head class 242. The physical model class definition has a two-layered conceptual hierarchy constructed of a super-class (physical model root class 241) and lower level sub-classes. FIG. 11 shows examples of the sub-classes. The physical model head class 242 has a slot 2421 for storing a pointer to a region object, a slot 2422 for storing a pointer to a physical phenomenon, and slots 2423 and 2424 for storing pointers to a problem name and time dependency, respectively. A physical region class 246 has a slot 2461 for storing a pointer to a polygon object constituting a region, and a slot 2462 for storing a material name of the region. Information is filled in these slots when each object of the physical model is instantiated. FIG. 26 is a flow chart showing the operation to be carried out by the physical model generating step 10. First at a shape defining object generating step 1301, the first area (shape defining area) 1201 of the input information is processed. FIG. 27 is a flow chart showing the details of the operations to be carried out by the shape defining object generating step 1301. The first area 1310 of the input information 27 is traced (at step 1310) to judge whether there is a point name (at step 1311). If there is a point name, it is checked whether the point name has already appeared (step 1312). This check is carried out in order to confirm if the subject point is already in the physical model now being generated. If the point name is of first occurrence, an instance of the point class 247 of the physical model definition 245 is generated, and the x- and y-coordinate values are stored in a slot of the point object. After all points have been processed, the first area information of the input information 27 is traced (step 1315) to process line segment information (steps 12316 to 1318). Stored in a slot of a line segment object is a pointer to the point object constituting a line segment. Then, polygon information is processed in the similar manner (steps 1319 to 1321). Since a polygon is not defined in duplicate, it is unnecessary to check whether a traced polygon has already been appeared. Next, at the physical region object generating step 1302, the third area (material name definition area) 1203 of the input information is processed. In this process, a combination of a polygon name and a material name is derived from the third area 1203 of the input information. Then, an instance of the physical region class 246 of the physical model class definition is generated. A pointer to the polygon object corresponding to the polygon name is stored in the slot 2461 in FIG. 11, and the material name is stored in the material name slot 2462. The fourth area (physical phenomenon defining area) 1204 of the input information is then processed at the physical phenomenon object generating step 1303. In this process, a combination of a line segment name and a boundary condition name is traced from the fourth area of the input information. An instance of the boundary condition class of the physical model class definition is generated, and a pointer to the line segment object corresponding to the boundary condition name is stored in the slot. Then, a combination of a physical phenomenon name and a polygon name is traced from the fourth area of the input information. An instance of the physical phenomenon class 243 of the physical model class definition 24 is generated. A pointer to the polygon object corresponding to polygon object name is stored in the slot 2431, the physical phenomenon name is stored in the physical phenomenon name slot 2432, and a pointer to the boundary condition object is stored in the slot 2433. An instance of the physical attribute class 250 is generated, a pointer to the physical attribute is stored in the slot 2434, and the values of the initial condition and source effect of the input information are stored in the slot of the physical attribute object. Lastly, the second area (problem name and time dependency defining area) 1203 of the input information is processed at the physical model head object generating step 1304. First, an instance of the physical model head class 242 of the physical model class definition is generated. A pointer to the object generated at step 1302 is stored in the slot 2422 for storing a pointer to the physical region, and a pointer to the object generated at step 1303 is stored in the slot 2421 for storing a pointer to the physical phenomenon. Necessary input information is copied to the problem name slot 2423 and the time dependency information slot 2424. The flow at the physical model generating step has been described above.

Figure 31:
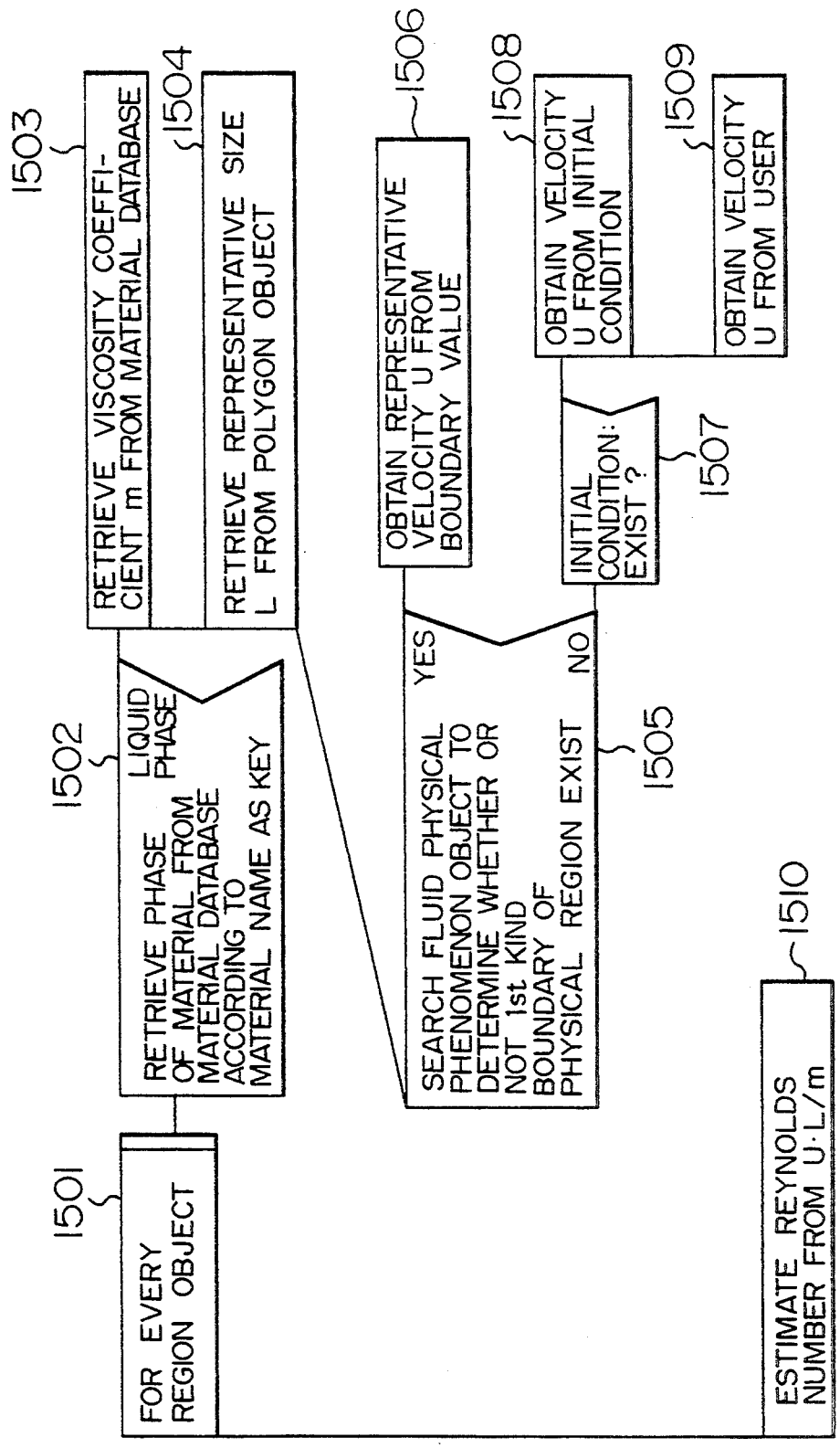
FIG. 31 is a flow chart showing the operation of a physical characteristic value deriving method.

The physical model head class 242 also has methods for deriving physical characteristic values for a given problem. The methods include, for example, a method 2425 for calculating a Reynolds number, a method 2426 for calculating a compressibility coefficient, a method 2427 for calculating a Peclet number, and the like. These methods calculate characteristic values by deriving necessary parameters from physical region objects, from physical phenomenon objects connected at the lower level to the physical model head class of the physical model 11, and from the material database 14. FIG. 31 is a flow chart showing the details of the methods 2425 for calculating a Reynolds number. For each physical region object connected to the physical model head class (step 1501), the material database is accessed using the material name as a key to check whether the physical region is liquid phase (step 1502). If not, a Reynolds number cannot be calculated so that the next physical region is checked. If liquid phase, a viscosity coefficient m is retrieved from the material database (step 1503), and a representative length L is retrieved from a polygon object defining the physical region (step 1504). The representative length L is, for example, a maximum length of sides of a polygon. Next, a physical phenomenon object regarding fluid flow ("fluid flow" in the physical phenomenon name slot) connected to the physical model head class is traced, and the corresponding boundary condition object is checked whether there exists a first kind boundary condition (step 1505). If exists, the maximum value of the first kind boundary condition is used as the representative fluid velocity U, if not, the initial condition of the fluid velocity is obtained from the attribute object at the lower level than the physical phenomenon object, and is used as the representative fluid velocity U (steps 1507 and 1508). If the initial condition is not being designated, a user is requested to enter a representative fluid velocity (step 1508). A Reynolds number is then estimated from UL/m (step 1510). Physical characteristic values calculated by methods are used as keys for retrieving suitable partial differential equations in generating a mathematical model, which will be described below.

Mathematical Model Generating Step 18

Figure 12:
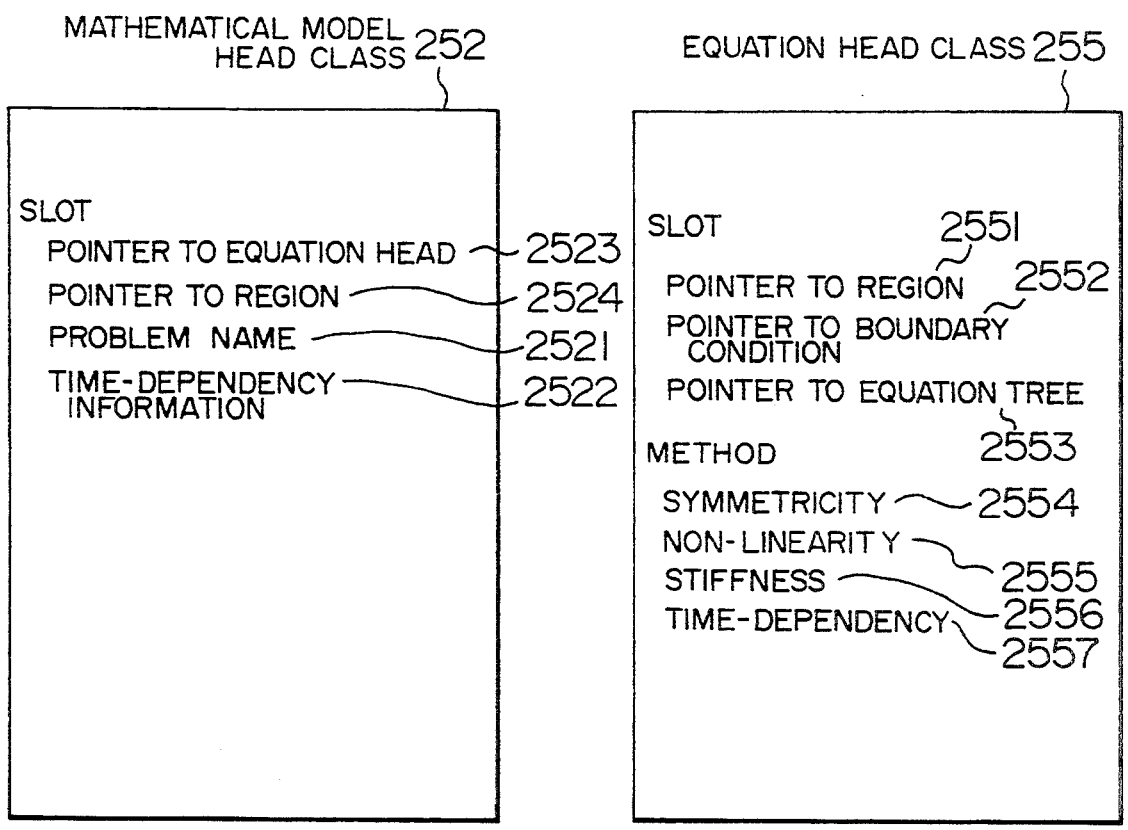
FIG. 12 illustrates class definition of a mathematical model.

The details of the mathematical model generating step 18 shown in FIG. 7 will be described while giving the description of the structure of the mathematical model class definition 25, material database, and equation database 15. The mathematical model generating step 18 receives the physical model 11. The step 18 generates instances of the physical model in accordance with the mathematical model class definition 24 and equation database 15, and generates the mathematical model 12 by retrieving proper material constants from the material database 14. Similar to the physical model 11, the mathematical model 12 is described by a tree having objects corresponding to regions and equation constituent elements, the objects being coupled by pointers. Each object is generated as an instance of the subject class of the mathematical model class definition 25. The class definition 25 is constructed of a super-class (mathematical model root class 251) and lower level sub-classes. Information is filled in slots when each object of the mathematical model 12 is instantiated. FIG. 28 is a flow chart showing the operations to be carried out at the mathematical model generating step 18. The contents of processing at step 18 will be described in detail with reference to FIG. 28. First, at step 1401 there is generated an instance of a mathematical model head class 252 of the mathematical model class definition 25. As shown in FIG. 12, the mathematical model head class 252 has slots for storing a problem name, time dependency information, pointer to an equation head, and pointer to a polygon constituting calculation regions (2521, 2522, 2523, and 2524). The former two parameters are the same as those stored in the slots 2433, 2434 of the physical model head object 111, so that they are copied therefrom (step 1401). As the pointer 2524 to a polygon region, the pointers to the polygon regions stored in the physical regions 112 and 113 of the physical model 11 are copied (step 1408). Next, at steps 1402 and 1403, equations are generated while sequentially referring to the physical phenomenon objects of the physical model 11, and the pointer to each equation is stored in the slot 2523 of the mathematical model head class 252.

Figure 14:
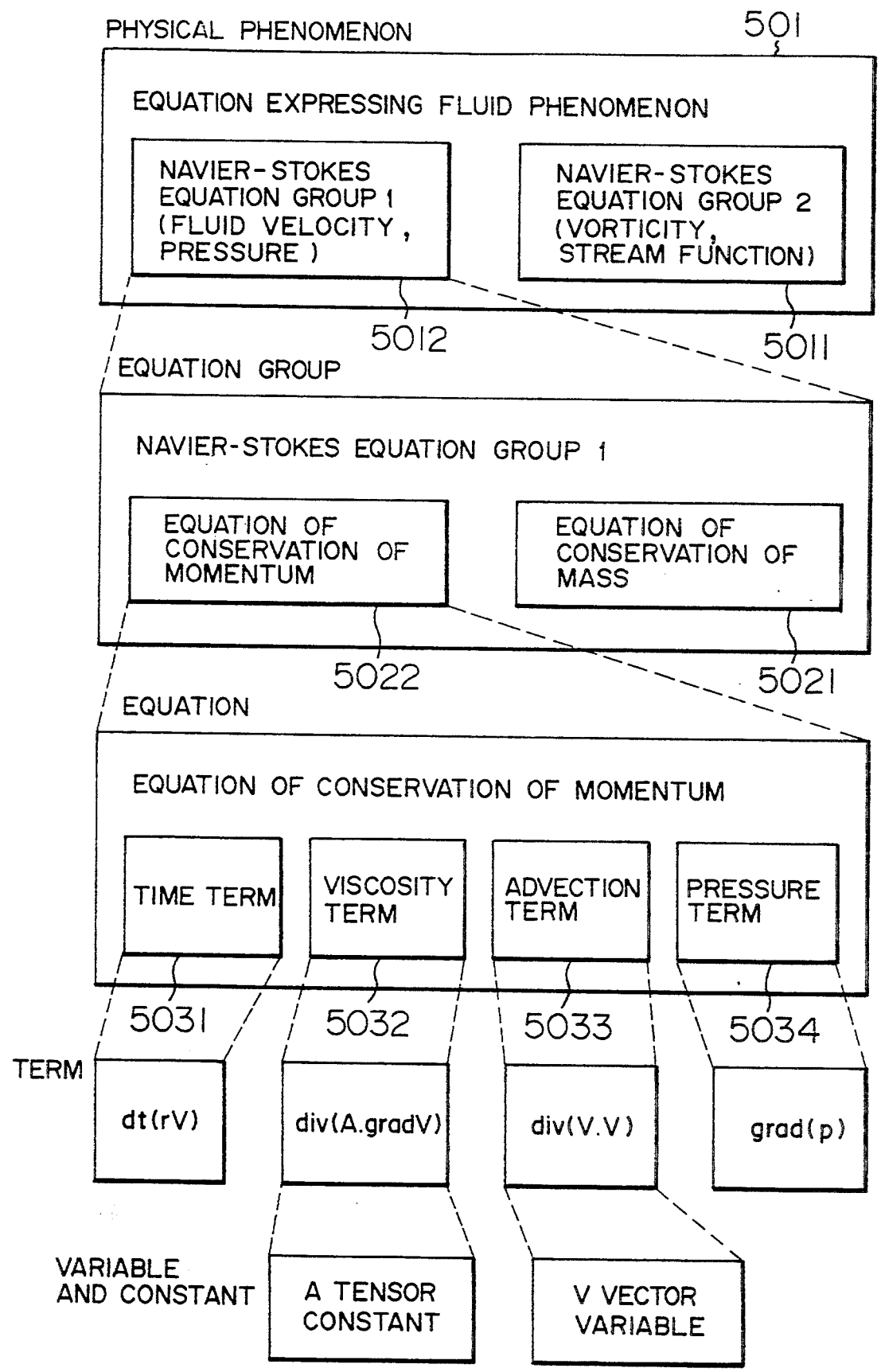
FIG. 14 illustrates ownership hierarchy of differential equations.
Figure 15:
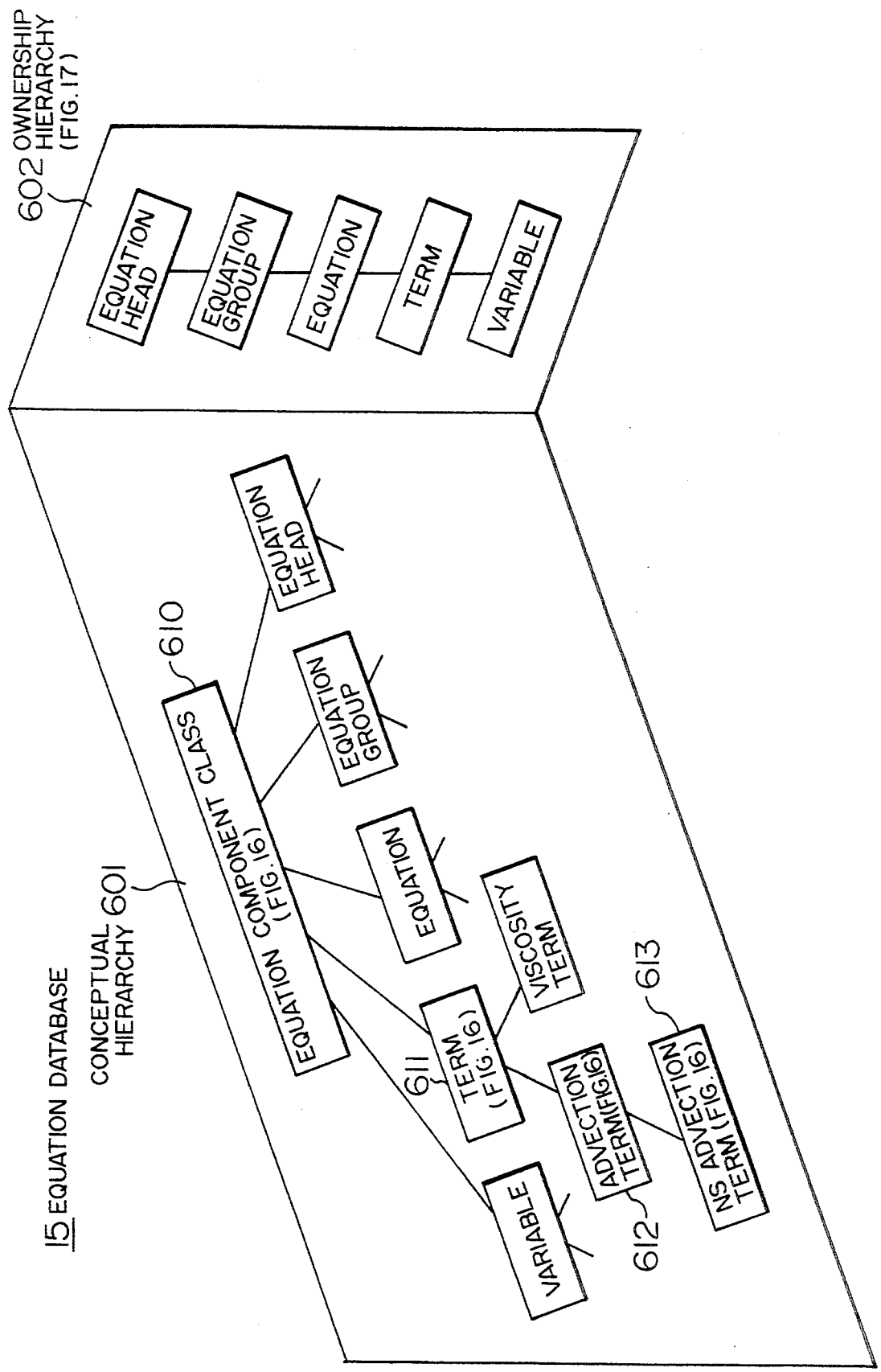
FIG. 15 illustrates an equation database.
Figure 16:
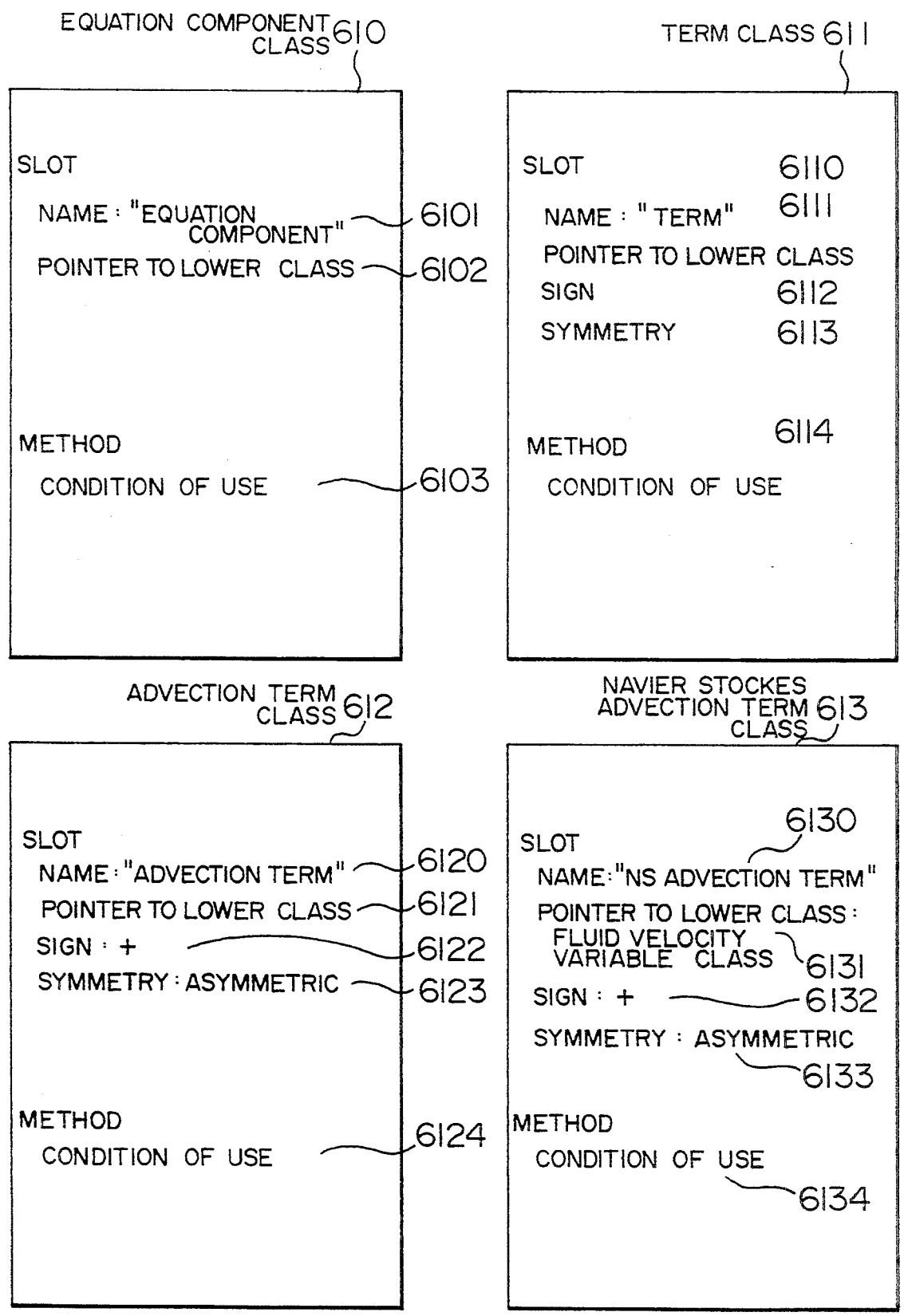
FIG. 16 illustrate class definition in the equation database.
Figure 17:
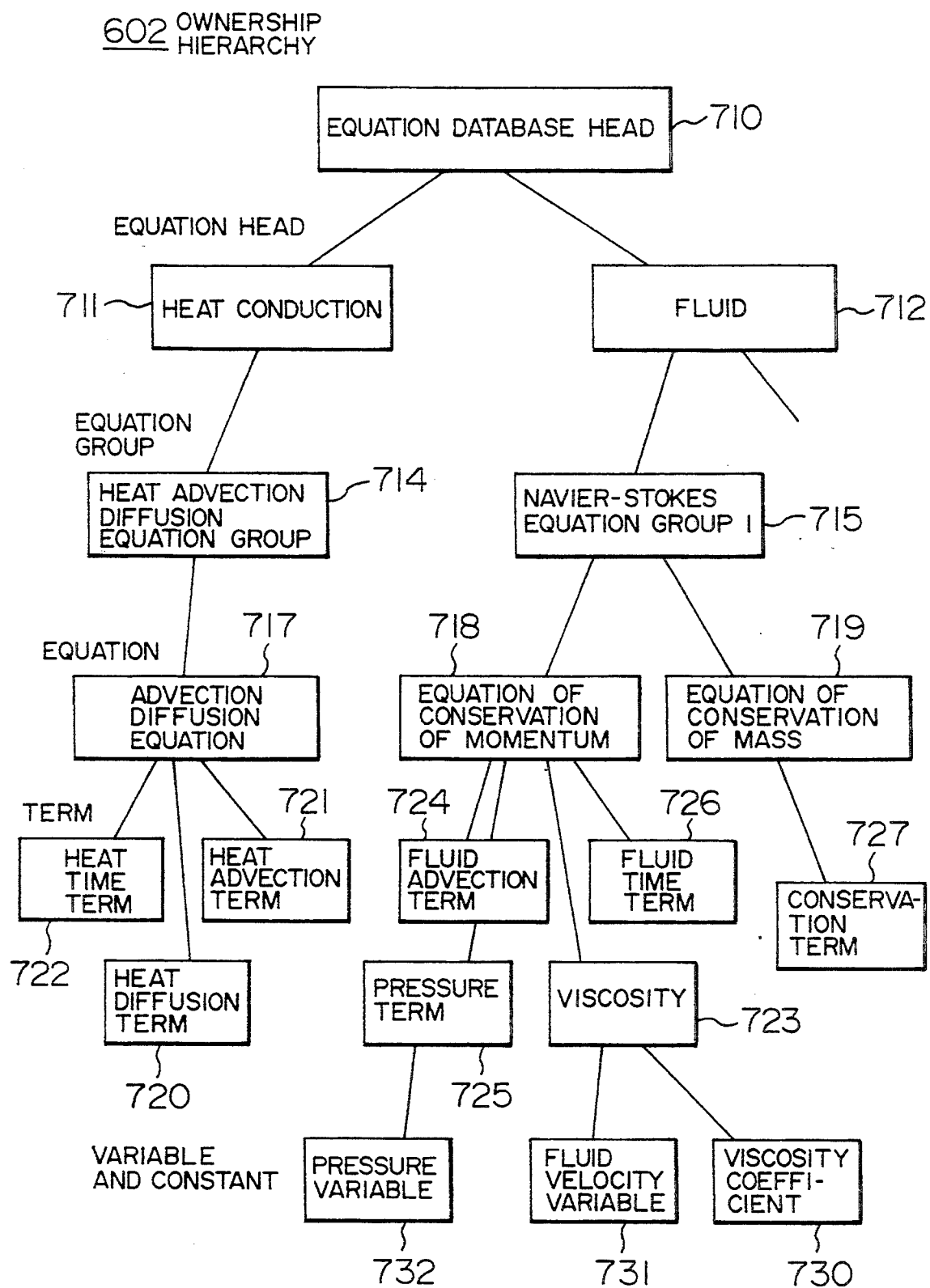
FIG. 17 illustrates ownership hierarchy of the equation database.

The structure of the equation database will be described with reference to FIGS. 14 to 17. FIG. 15 is a schematic diagram of the equation database. As seen from FIG. 15, the equation database 15 has two hierarchies. One is a conceptual hierarchy 601 between classes (between super-class and sub-classes), and the other is an ownership hierarchy 602 between classes, the latter representing the possessive relation between the equation constituent elements. The ownership hierarchy indicates the structure of equations, which is essential for the present embodiment. The conceptual hierarchy indicates a conceptual hierarchy between equation constituent elements (such as terms and variables), which is not essential but contributes to efficient description of the database. A need of the ownership hierarchy 602 will be described with reference to FIG. 14. FIG. 14 illustrates general characteristic points of a partial differential equation. A fluid flow phenomenon and Navier-Stokes equation are used by way of example. A Navier-Stokes equation is a name standing for general equations which describe fluid flow phenomena. There are many Navier-Stokes equations each slightly modified. Various terms are added when such an equation is combined with another physical phenomenon such as thermal and electro-magnetic field. It is therefore necessary to select a suitable equation group for describing a given problem from a number of groups. Reference numeral 501 represents such equation groups 5012 and 5011, the group 5012 including equations represented by fluid velocity and pressure, and the group 5011 including vorticity and stream function. Consider the equation group 5011 formulated by fluid velocity and pressure. This group includes equations 5022 of conservation of momentum and equations 5021 of conservation of mass. In the case of a momentum conservation equation 5022, there are four lower level terms including a time term 5031, viscosity term 5032, advection term 5033 and pressure term 5034. In the case of the viscosity term 5032 for example, it has viscosity tensor and fluid velocity vector as its variables. As above, the structure of a Navier-Stokes equation has an ownership hierarchy in which the upper level structure (e.g., equation) owns a lower level structure (e.g., term). This is also true for other equations describing different physical phenomena. The equation database 15 is constructed by using the above-described hierarchical nature of equations. FIG. 17 shows the details of a particular ownership hierarchy 602. This ownership hierarchy 602 reflects the hierarchy shown in FIG. 14. Under the equation database head class 710, classes (such as heat convection class 711 and fluid flow class 712) representative of physical phenomena are positioned. Under these classes, there are positioned equation group classes describing physical phenomena, such as a heat advection diffusion equation group class 714 and Navier-Stokes equation group class 715. Under these classes, there are positioned each equation class and term classes constituting the equation class. Such an ownership hierarchy can be implemented by storing a pointer to a lower level class owned by an upper level class in the slot of the upper level class as its default value. For example, in FIG. 17, the Navier-Stokes advection term 724 owns a fluid velocity variable 731. This can be indicated as shown in FIG. 16 by storing a pointer to the fluid variable class in a lower class pointer slot 6131 of the Navier-Stokes advection term class at its default value. Next, the other hierarchy, i.e., conceptual hierarchy 601 of the equation database will be described. The conceptual hierarchy 601 arranges the concept of classes in a hierarchical manner. The class at the upper level stores a more general slot, and the class at the lower level stores a more specific slot. For example, as shown in FIG. 16, the equation component class 610 has a name slot 6101 and a slot 610 for storing a pointer to a lower level class. The former slot stores a value "equation component", and the value of the latter slot is left indefinite. The term class 611 which is a subclass of the equation component class 610 has a name slot 6110 inherited from the equation component class, a slot 6111 for storing a pointer to a lower level class, and slots 6112 and 6113 for storing the sign and symmetricity of a term, respectively, which are specific to the term concept. The values of these slots are indefinite. The advection term class 612 which is a sub-class of the term class 611 has four slots 6120 to 6123 inherited from the term class, of which two slots 6122 and 6123 store default values of the sign and symmetricity which have been indefinite at the term class. The Navier-Stokes advection term class 613 which is a sub-class of the advection term class 612 has four slots inherited from the advection class, among which the slot 6131 stores a pointer to the fluid velocity class which has been indefinite at the advection class. Each class of the equation database 15 also has a method for judging if the class can be used under the given conditions of a problem. The method is defined at the highest level equation component class 610, and is inherited to all lower level classes. The contents 6103 of the method are over-ridden (set again) at each class. In the example shown in FIG. 16, the condition "t (always usable)" is stored at the equation component class 610 and term class 611 as there default values. However, at the lower level Navier-Stokes advection term class 6134, the condition of use is specific to the term class, such as "if the problem is for a fluid flow and the Reynolds number is not 0, then usable". With the conceptual hierarchy, it is possible to store the condition common to all term classes in the term classes, and to store the condition specific only to an advection term class in the advection class lower than the term class. As a result, the same data is not stored in duplicate and the database can be described efficiently. The foregoing is the description of the equation database 15 in connection with the ownership hierarchy 601 and conceptual hierarchy 602.

Figure 19:
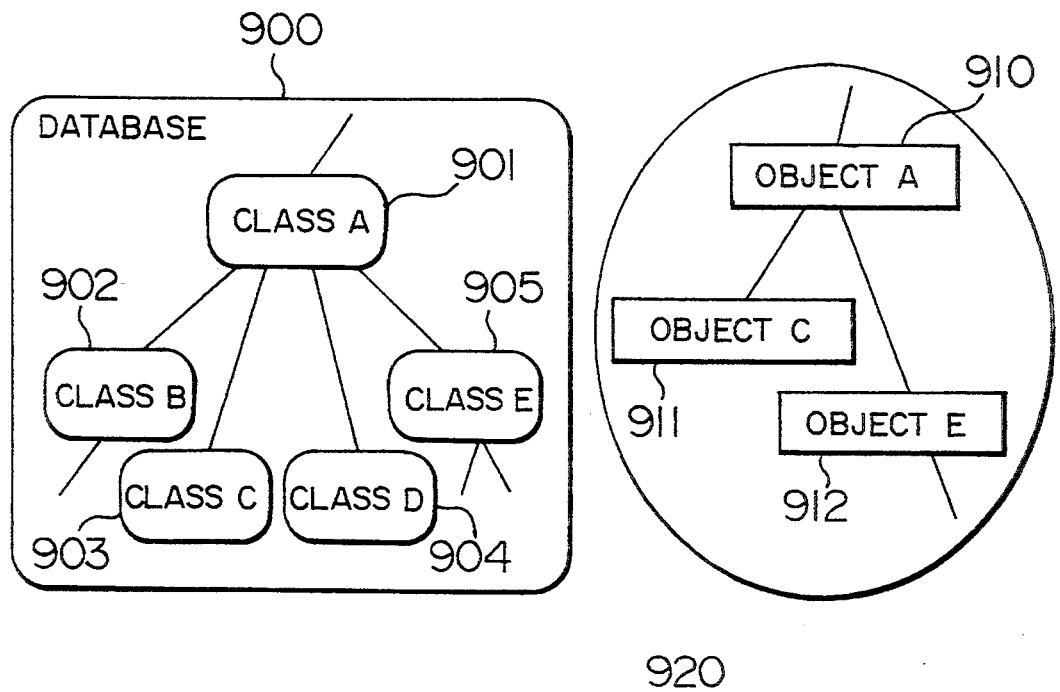
FIG. 19 illustrates a method of retrieving the database.
Figure 29:
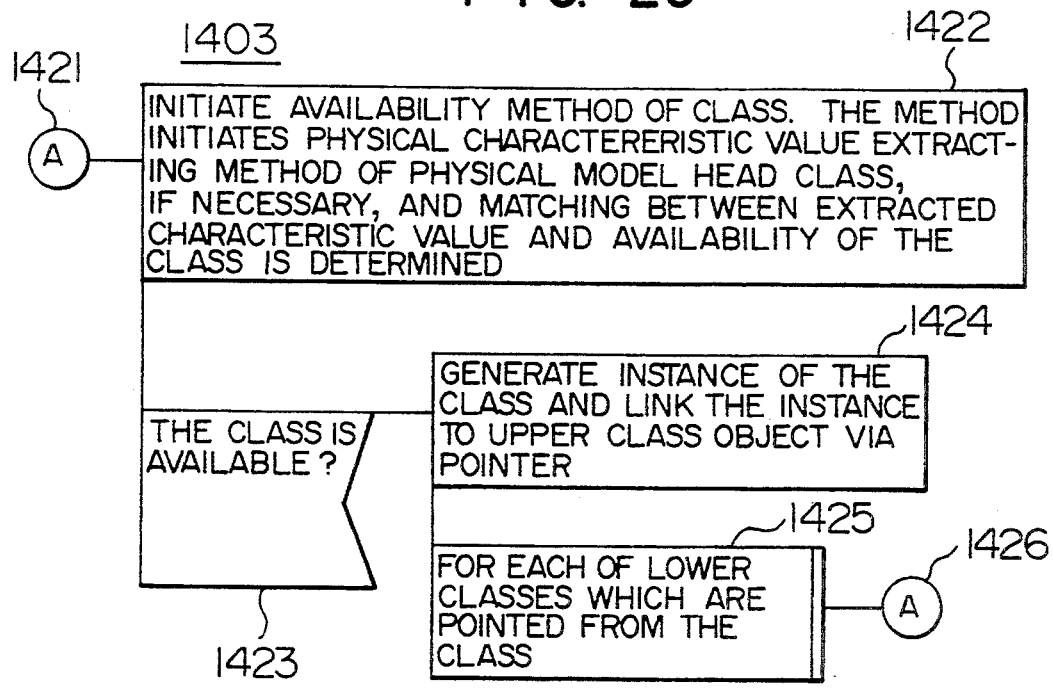
FIG. 29 is a flow chart showing the operation of searching the equation database.

Next, there will be given the description how the equation database is accessed at step 1403 in FIG. 28 to generate equations, with reference to FIGS. 29 and 19. In the schematic diagram of FIG. 19, reference numeral 900 indicates part of the equation database, and reference numeral 920 indicates objects (i.e., equations) generated as the instances of the classes. The process shown in FIG. 28 is basically a depth first process using the ownership hierarchy 602 of the equation database 15. First, consider a class 901. The condition of use method of the class 901 is initiated to check whether the class can be used for the present problem (step 1422). The condition of use method initiates the physical characteristic value deriving method of the physical model head class 111, to receive a physical characteristic value such as a Reynolds number. In accordance with the received characteristic value, the condition of use method judges if the class is usable or not. If judged not usable, the process for that class is terminated. If usable, an instance 910 of the class is generated (step 1424), and referring to the pointer to the lower class stored in the subject class 901, the lower classes are recursively checked in the similar manner as above (steps 1425, 1426 and 1421). Assuming that such processing results in three usable classes A, C and E among five classes A 901 to E 905 910 in the equation database 900, the instances of the three classes only are generated, providing a tree constructed of three objects indicated at 920.

Figure 30:
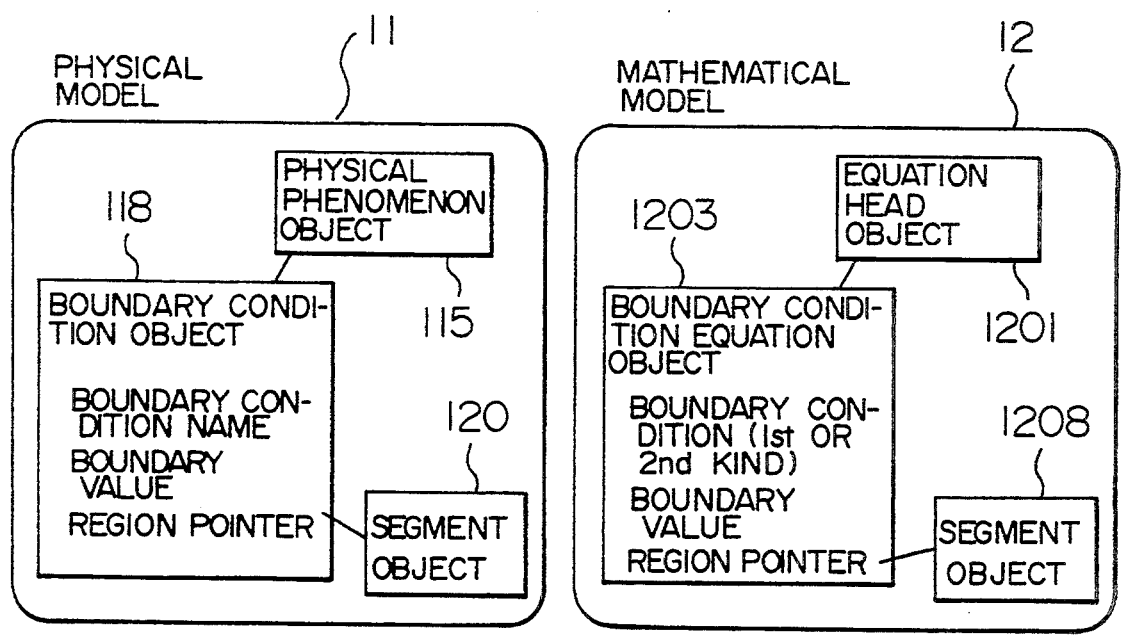
FIG. 30 illustrates how boundary condition equation objects are generated.

Returning back to FIG. 28, after the equations are generated and stored in the mathematical model as described above, material constants are determined while referring to the material database 14 (step 1404). In this embodiment, a constant is retrieved from the material database 14 using the material name of each region and its physical phenomenon name as the keys, and the constant is stored in the slot of the variable object positioned at the lowest level of the equation tree. Next, a pointer to the polygon object is copied from the physical attribute object to the region pointer slot of the equation head object (step 1405). Lastly, the boundary condition object connected to the subject physical object is referred to (step 1406) and the boundary condition is reflected to the mathematical model (step 1407). FIG. 30 is a schematic diagram showing how the boundary condition equation object is generated. First, an instance 1203 of the boundary condition equation class in the mathematical model class definition 25 is generated, and a pointer to the instance is stored in the equation head object 1201. Next, a boundary value is copied from the corresponding boundary condition object 118 in the physical model to the boundary value slot of the boundary condition equation object 1203. Similarly, a pointer to the border line segment is copied from the boundary condition object to the border line segment slot. Then, the boundary condition name is derived from the boundary condition name slot of the boundary condition object 118 to discriminate whether the boundary condition is the first kind or second kind. The discriminated boundary condition kind is stored in the boundary kind slot of the boundary condition equation object 1203. Such discrimination can be realized easily by referring to a simple table, because the boundary condition name such as "Inflow" and "Fixed temperature" has one-to-one correspondence with the boundary condition kind. The foregoing is the detailed description of the mathematical model generating step for transforming the physical model to the mathematical model. The mathematical head class 255 also has methods for deriving mathematical characteristic values of the generated equations. These methods include a method 2554 for deriving a symmetricity, a method 2555 for deriving an non-linearity, a method for calculating a stiffness, and the like. These methods calculate characteristic values in accordance with necessary parameters derived from the equation tree connected to the equation head class. For example, the symmetry deriving method 2554 traces the equation tree to find the term object, and checks its symmetry slot. If all term objects have a value "symmetry", then the equation is symmetrical. The method then sends back the value "symmetry". If not, a value "asymmetry" is sent back. The mathematical characteristics extracted by these methods are used as keys for retrieving proper numerical value calculation procedures (numerical algorithms).

Calculation Model Generating Step 19

Figure 10:
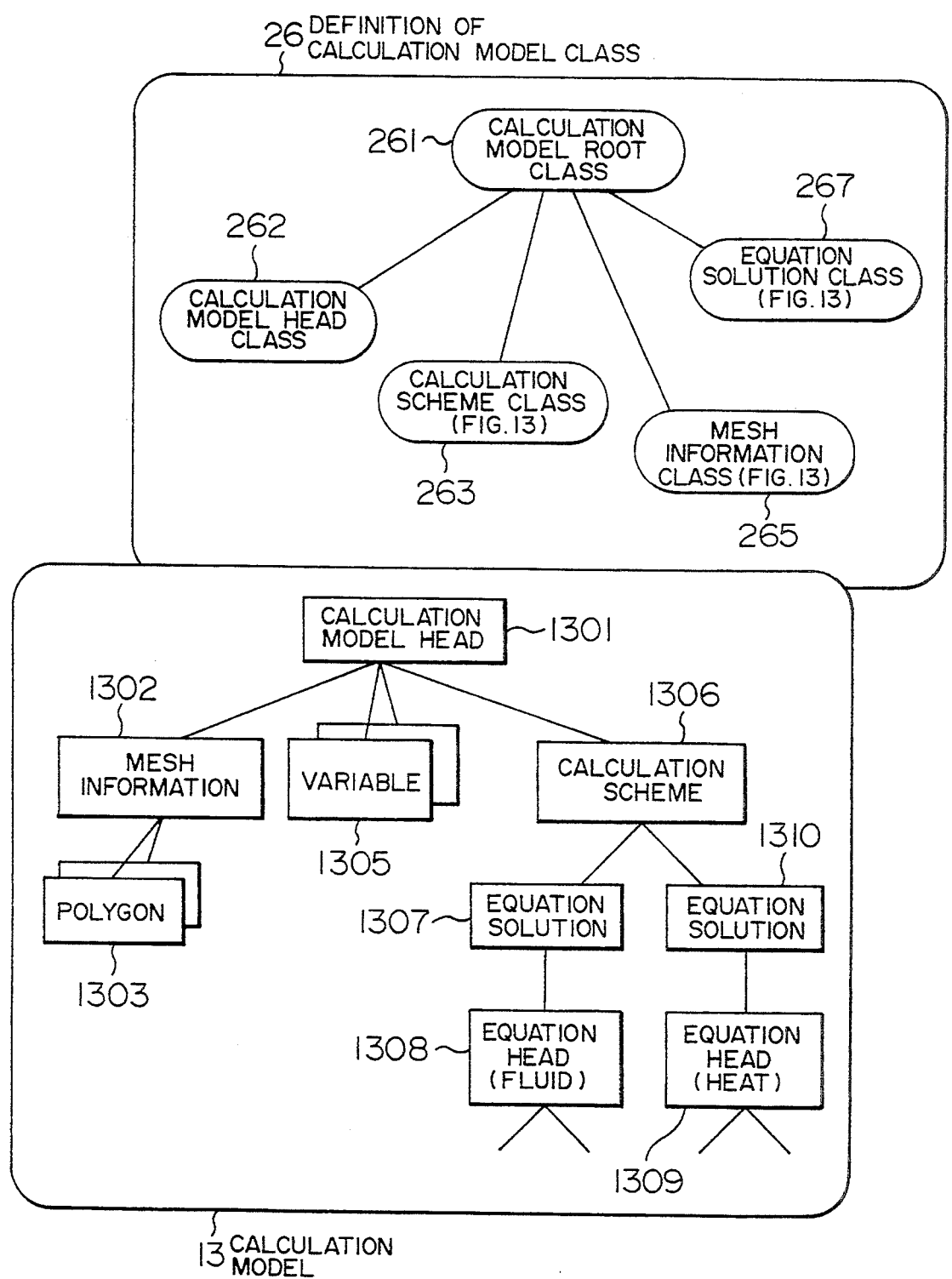
FIG. 10 illustrates a calculation model.
Figure 32:
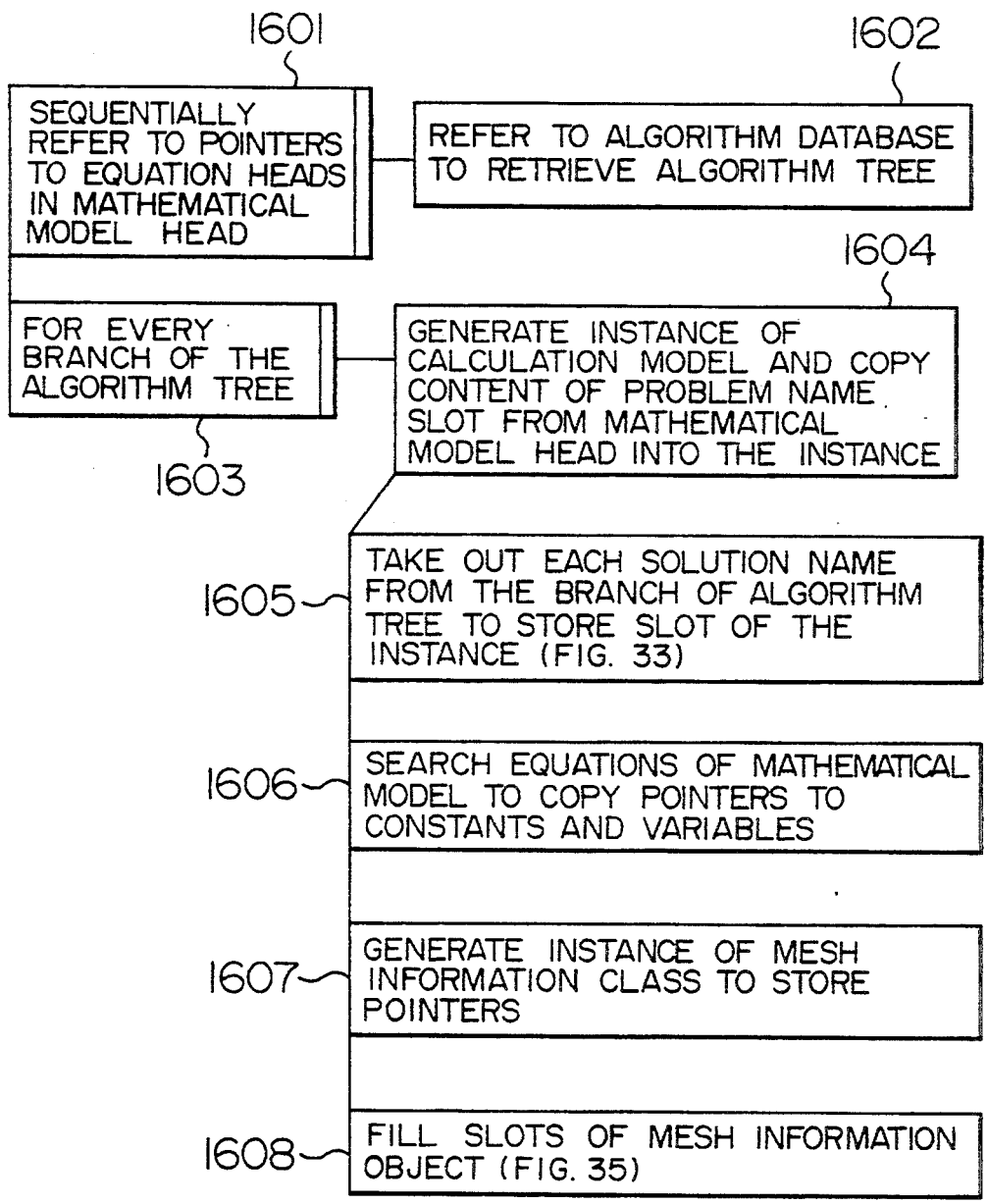
FIG. 32 is a flow chart of a mathematical model generating step.

Next, there will be described the details of the calculation model generating step 19 for transforming the mathematical model 12 to the calculation model 13. The calculation model generating step 19 generates the calculation model 13 while referring to the algorithm database 16 and calculation model class definition 26. As shown in FIG. 10, similar to the physical model 11 and mathematical model 12, the calculation model 13 is described as a tree having objects corresponding to regions, variables/constants, and equation solutions, the objects being connected by pointers. Each class in the calculation model class definition 26 is instantiated to generate a corresponding object. The calculation model class definition 26 is constructed of a super-class (calculation model root class 261) and lower level subclasses. Information is filled in a slot of each class when a corresponding object in the calculation model 13 is generated as an instance. The calculation model generating step 19 will be described while detailing the structure of the algorithm database 16 and database retrieving method. FIG. 32 is a flow chart showing the operations to be executed at the calculation model generating step 19. Pointers to equation head stored in the mathematical model head 1200 in the mathematical model 12 are sequentially referred to (step 1601), and an algorithm tree (FIG. 20) for a set of equations linked from each pointed equation head is generated while referring to the algorithm database 16.

Figure 18:
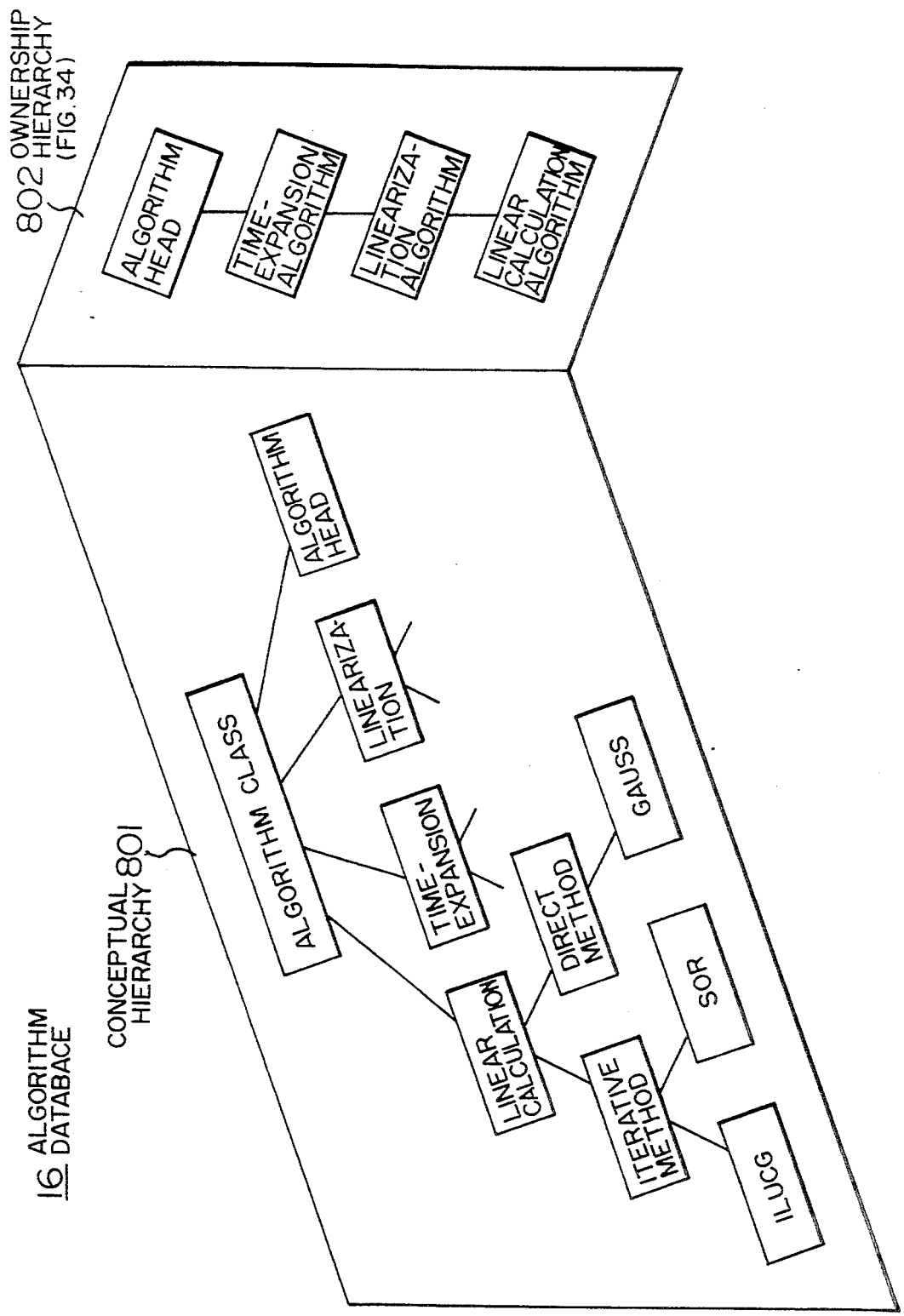
FIG. 18 illustrates an algorithm database.
Figure 34:
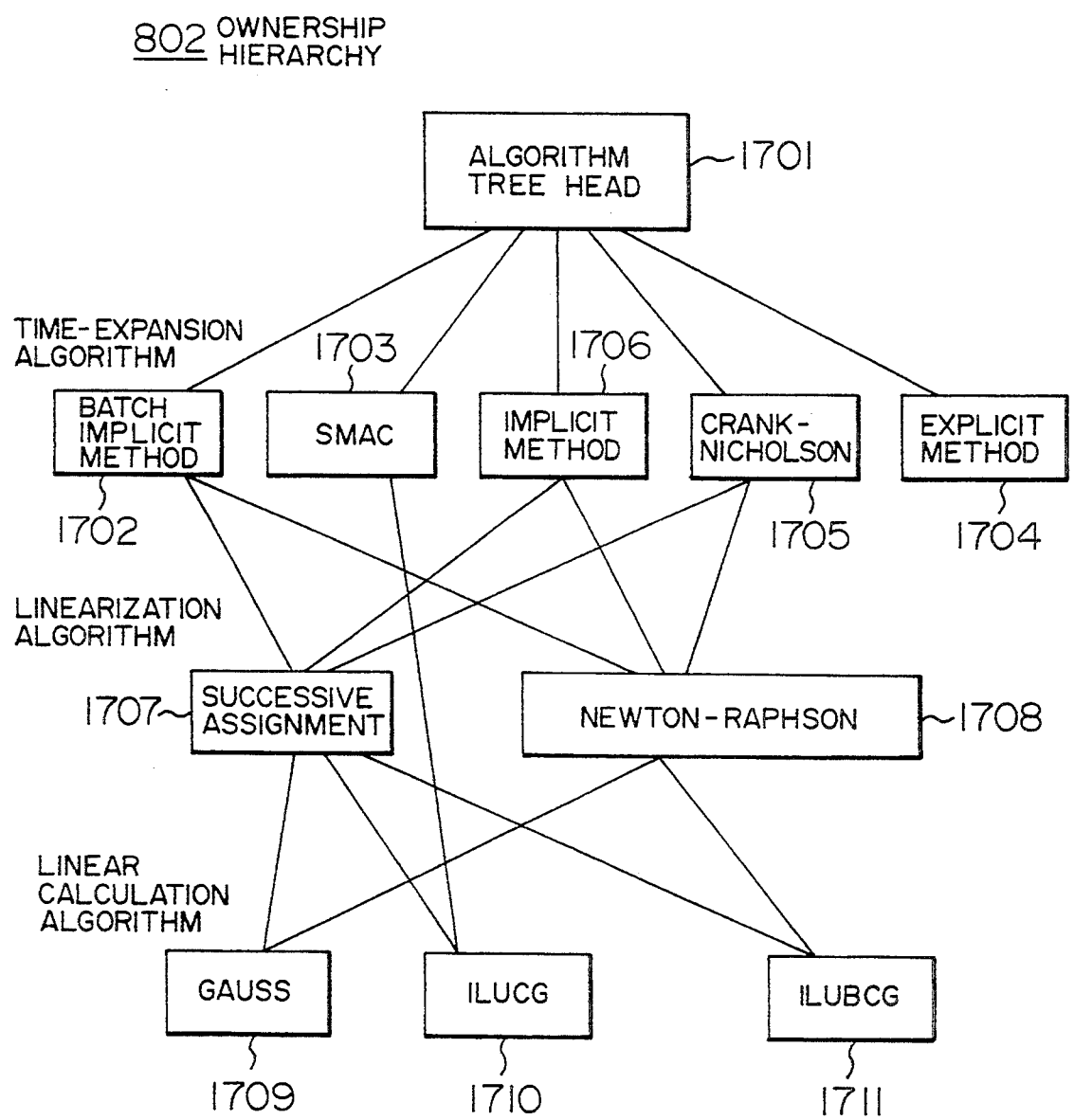
FIG. 34 illustrates ownership hierarchy of the algorithm database.

The structure of the algorithm database 16 will be described below. FIG. 18 is a schematic diagram of the algorithm database 16. Similar to the equation database 15, the algorithm database 16 uses a conceptual hierarchy 801 and ownership hierarchy 802. The ownership hierarchy covers possible combinations of numerical value calculation procedures. FIG. 34 shows an example of the ownership hierarchy 802. An algorithm tree head class 1701 is positioned at the highest level. A pointer group stored in the slot of the head class points time-expansion algorithms (1702 to 1706). At the lower level of these algorithms, linearization algorithms (1707 and 1708) are positioned, and at the lowest level there are linked linear calculation algorithms (1709 to 1711). Each link shown in FIG. 34 indicates that an upper level algorithm can be combined with its lower level algorithm. For example, consider an equation which is time-dependent and nonlinear. In this case, if the Crank-Nicholson method is used as the time-expansion algorithm, it is possible to use the successive assignment method and Newton-Raphson method in order to linearize the equation. If the Newton-Raphson method is used, the ILUCG method cannot be used as the linear calculation algorithm. Alternatively, if the explicit method is used as the time-expansion algorithm, there is no need of selecting the linearization algorithm or linear calculation algorithm. Similar to the equation database 15, the ownership hierarchy can be realized by storing a pointer to an owned class (lower class) in a slot of an owing class (upper class) as its default value. The conceptual hierarchy 801 hierarchically arranges the numerical value calculation procedures. Similar to the equation database 15, the upper level class of the conceptual hierarchy 801 stores general properties and the lower level class stores properties specific to its class. For example, a linear calculation algorithm such as the ILUCG method and SOR method belongs to the category of the iterative method, and the iterative method and direct method belong to a general linear calculation method. Similar to the equation database, the conceptual hierarchy can be realized using inheritance between classes. The foregoing is the description for the algorithm database 16.

Figure 20:
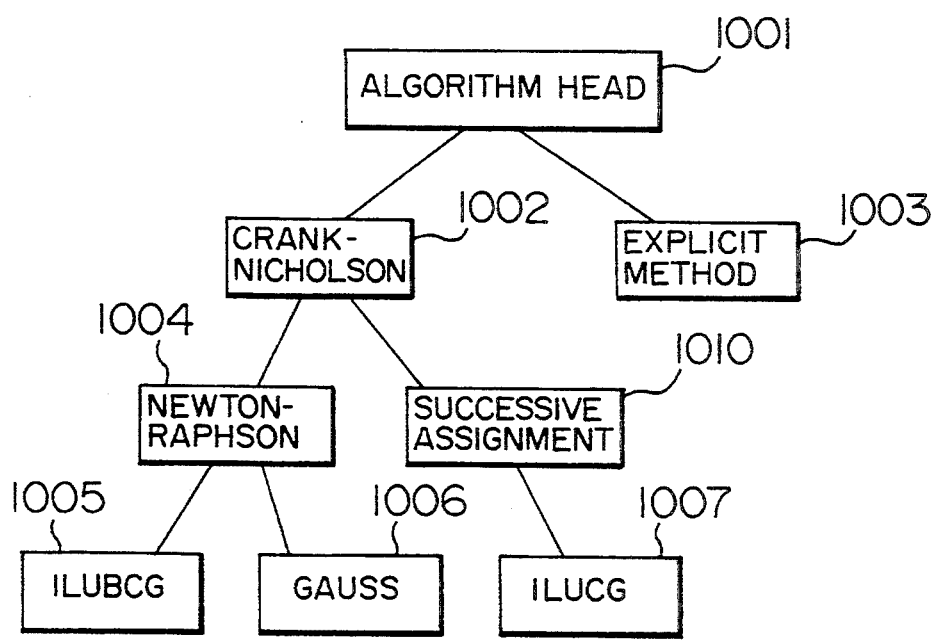
FIG. 20 illustrates an algorithm tree.
Figure 33:
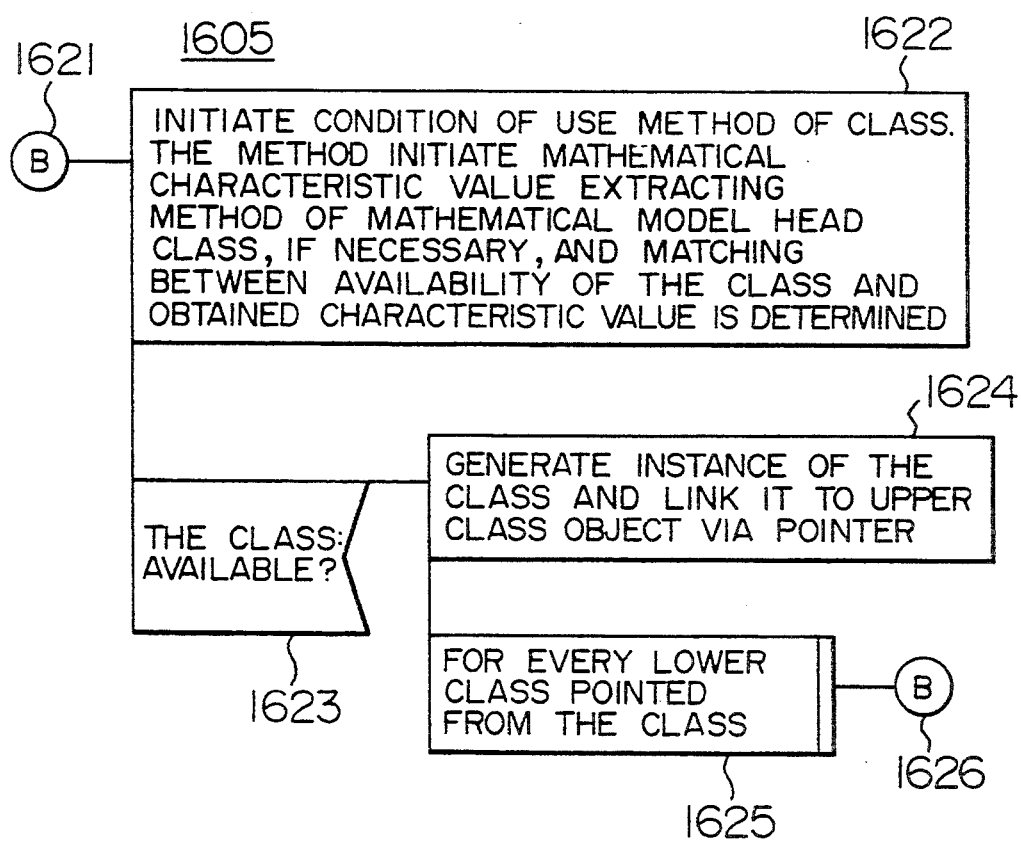
FIG. 33 is a flow chart showing the operation of searching the algorithm database.

A step 1602 in FIG. 32 for generating an algorithm by accessing the algorithm database will be described with reference to FIG. 33 and 19. Similar to the equation tree generating step 1403, the process at this step 1602 is a depth first process using the ownership hierarchy 802 of the algorithm database. In FIG. 19, reference numeral 900 represents part of the algorithm database, and reference numeral 920 represents an algorithm tree. First, consider a class 901. The use allowable condition method of the class 901 is actuated to check whether the class can be used for the equation to be solved (step 1622). The condition of use method actuates the mathematical characteristic value deriving method of the equation model head class 1308, to receive a mathematical characteristic value such as symmetricity and time-dependency. In accordance with the received characteristic value, the condition of use method judges if the class is usable or not. If judged not usable, the process for that class is terminated. If usable, an instance 910 of the class is generated (step 1624), and referring to the pointer to the lower class stored in the subject class 901, the lower classes are recursively checked in the similar manner as above (steps 1625, 1626 and 1621). With such processing, an algorithm tree such as shown in FIG. 20 is generated. In this example, paths (branches) from the root 1001 to the lower level classes indicate combinations of numerical value calculation procedures for solving the equation. In the example shown in FIG. 4, there are four combinations of numerical value calculation procedures, including [Crank-Nicholson 1002, Newton-Raphson 1004, ILUCG 1005], [Crank-Nicholson 1002, Newton-Raphson 1004, GAUSS 1006], [Crank-Nicholson 1002, Successive Assignment 1010, ILUCG], and [Explicit Method 1003]. For a plurality of equations, the same number of algorithm trees are generated by using a loop of steps 1601 and 1602.

Figure 13:
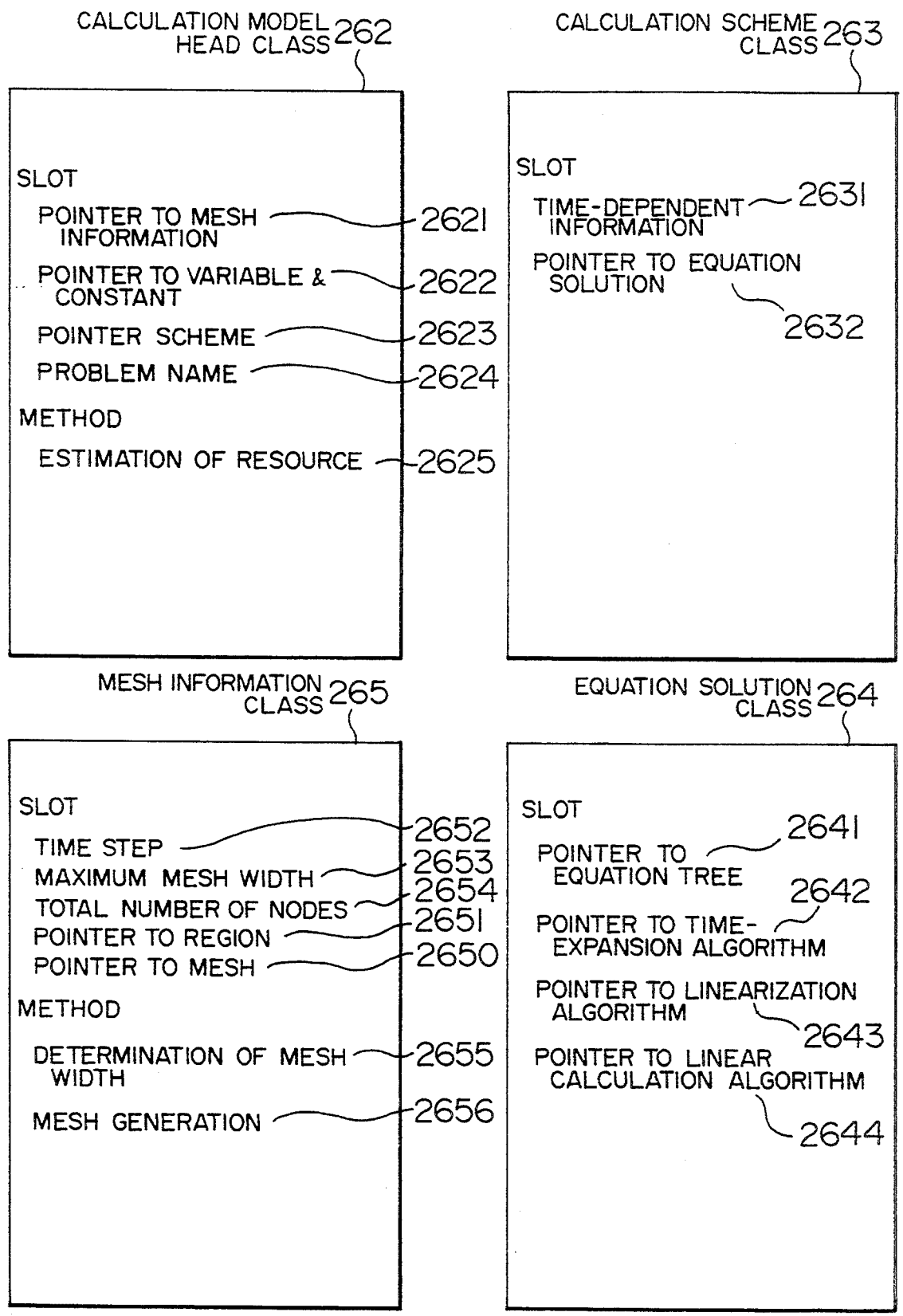
FIG. 13 illustrates class definition of a calculation model.
Figure 35:
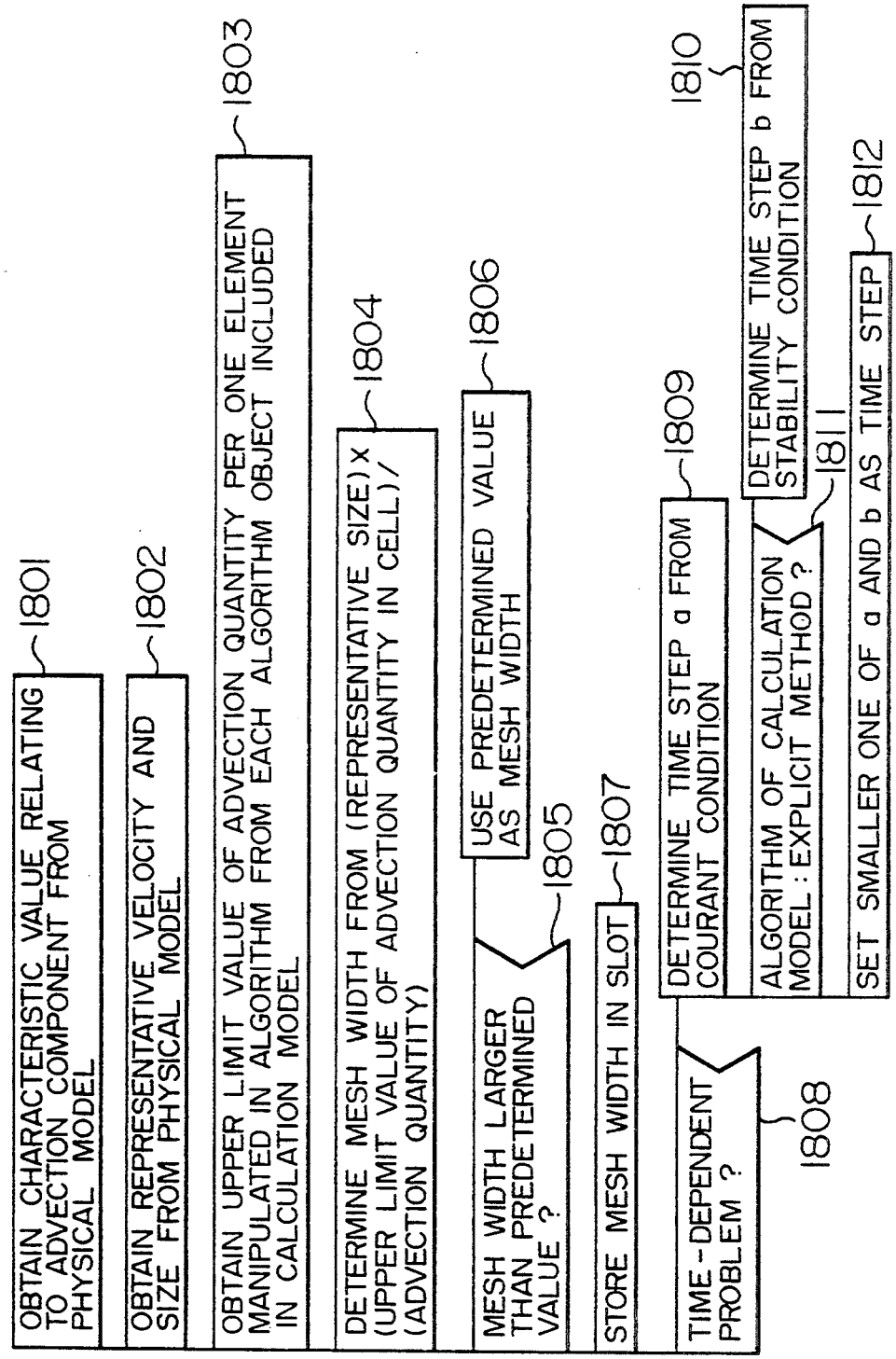
FIG. 35 is a flow chart showing the operation of a method of determining a space division and time step.

After generating an algorithm tree, the flow advances to a step 1603 for processing each branch of the tree. If there is a plurality of trees, combinations of branches of all trees are processed. For example, if an equation a is provided with four branches and an equation b is provided with three branches, the step 1603 processes twelve combinations of branches. First, an instance 1301 of a calculation model head 262 in the calculation model class definition 26 is generated, and the problem name is copied from the mathematical model head 1200 to a problem name slot 2624 (FIG. 13). Next, an instance of an equation solution class 264 in the calculation model class definition 26 is generated, and its pointer is stored in a scheme pointer slot 2623 of a calculation model head object 1301. Then, pointers to numerical value calculation procedures in a branch of the subject algorithm tree are derived and stored in a time-expansion algorithm pointer slot 2642, linearization algorithm slot 2643, and linear calculation algorithm slot 2644, respectively. Pointers to the equation head objects 1201 and 1204 are derived from the mathematical model 12 and copied to an equation pointer slot 2641 (step 1605). Next, the pointer to the variable/constant at the lowest level of the equation tree is collected and stored in a slot 2622 of the calculation model head object 1301. Lastly, an instance of a mesh information class 265 in the calculation model definition 26 is generated, and its pointer is stored in a slot 2621 of the calculation model head object 1301. The mesh information class 265 has the slots shown in FIG. 13 which are then filled in (step 1608). A pointer to the region of the mathematical model head object 1200 is copied to a region pointer slot 2651. Next, a mesh width determining method 2655 is initiated to determine the values to be stored in a maximum mesh width slot 2653 and time step slot 2652. FIG. 35 is a flow chart showing the operations to be executed by the mesh width determining method. First, the physical characteristic value deriving method (explained)of the physical model head object is initiated to obtain characteristic values such as Reynolds number and Peclet number regarding advection components (step 1801). Representative values such as representative length and velocity are also extracted from the physical model head object (step 1802). Also, there are obtained upper limits of the Reynolds number and Peclet number defined as the default numbers of the time-expansion object from each algorithm object included in the calculation model (step 1803). These values are indices for indicating how much advection quantity per one mesh can be stably calculated by the selected time-expansion algorithm. The maximum mesh width can thus be obtained by taking a ratio of the problem Reynolds number and Peclet number to the upper limits allowing calculation by the selected time-expansion algorithm, and scaling the ratio by the representative length. If there is less influence of advection, the obtained mesh width may become considerably large. In order to avoid such a case, if the obtained mesh width is greater than a predetermined value (e.g., 1/10 the representative length), the value replaces the calculated mesh width (steps 1805 and 1806). Then the mesh width is stored in the slot (step 1804). If the problem is time-dependent (step 1808), a time step is determined. First, the time step a is determined from the Courant condition (step 1809). The Courant condition is a condition that advection will not go over one mesh or more during one time step. If an explicit solution algorithm object is included in the calculation model (step 1809), a time step b is determined from the stability condition of the explicit solution method. This stability condition requests that the absolute eigen values for the diffusion effect must be less than 1. Lastly, the time steps a and b are compared with each other, and the smaller one is selected and stored in a slot 2652. The foregoing is the description for the mesh width determining method 2655. Lastly, a mesh generating method 2156 is initiated to generate a mesh by using the determined mesh width. A pointer to the generated mesh (node coordinate values and inter-node connection information) is stored in a slot 2650. There are several methods of mesh generation using a mesh width as a parameter. For example, it is possible to use a method of generating node groups each having a width equal to or less than a mesh width, by using random numbers, and determining the connection between nodes by performing a Delauney tesellation based upon the obtained node arrangement. When meshes are generated, the total number of nodes is stored in a slot 2654. In the above manner, all objects of the calculation model have been generated and their slots have been filled in. It is to be noted that the calculation models for all combinations of available algorithms have been generated. It is necessary to select an optimum one of these calculation models in order to execute numerical simulation. In view of this, a resource estimation method of the calculation model head object 1301 is initiated to calculate the CPU time and memory requirement for each calculation model. Since all information (numerical algorithms, meshes, time step) necessary for numerical simulation has been determined at this stage, it is possible to estimate the CPU time and memory requirement based upon these parameters. By using the estimated values, it becomes possible to automatically select a calculation model having a shortest CPU time (highest speed). Alternatively, a plurality of calculation models and their estimated values may be presented to a user for a final decision. The foregoing is the description of the process to be executed at the calculation model generating step 19.

Simulation Information Generating Step 20

Figure 36:
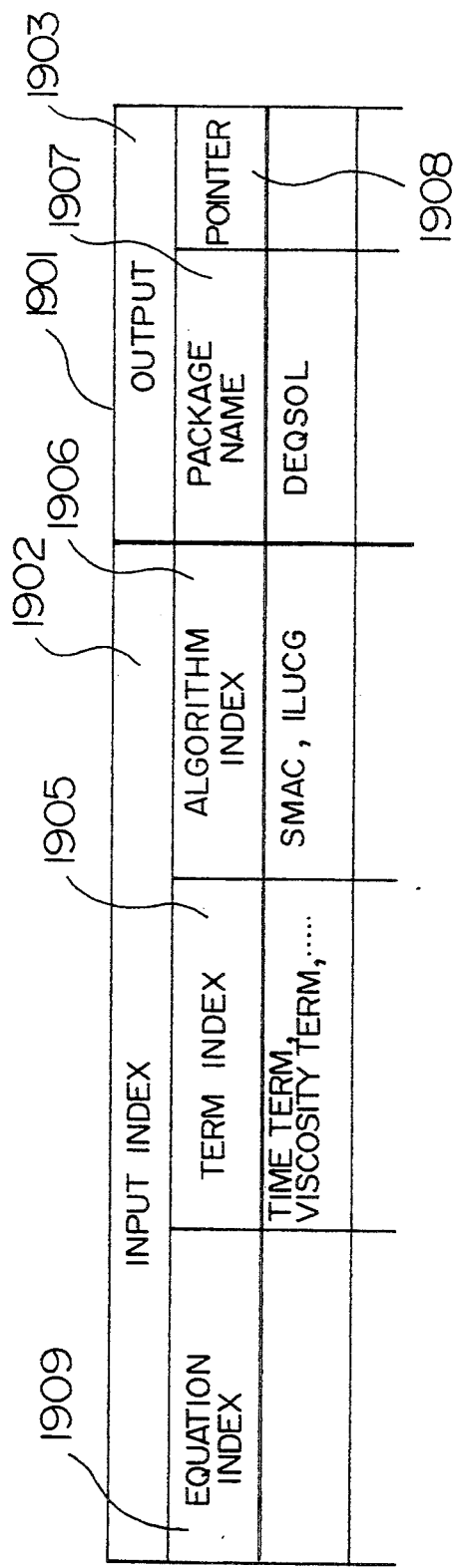
FIG. 36 shows the structure of a simulation package database.

Returning back to FIG. 7, upon selection of one calculation model, the simulation information generating step selects a simulation package suitable for executing the calculation model from the simulation package database 23, and generates simulation information 21 for the selected package. FIG. 36 shows the structure of the simulation package database 23. This database is designed in the form of a table such that the constituent elements or their names included in the calculation model 13 are inputted as key indices to output a suitable simulation package name 1907 and a pointer 1908 to a simulation information output routine for the package. The input key indices include an equation group name and equation name 1909, term name 1905, and algorithm name 1906. These key indices can be determined with reference to the equation solution objects 1308 and 1309. For example, assuming that the equation group name is "Navier-Stokes equation through formulation of fluid velocity and pressure", the equation name is "equation of conservation of momentum" and "equation of conservation of mass" the term name is "time term", "pressure term", "advection term", "viscosity term", "buoyancy term", and "diversion term", the time-expansion algorithm name is "SMAC" and the linear calculation algorithm name is "ILUCG", then it is possible to select a simulation package "DEQSOL" suitable for the combination of these equations and solutions. It is necessary to store in the database each process to be executed for each simulation package at the simulation information generating step. FIG. 37 shows an example of the process to be executed at the simulation information generating step for a variable-equation type simulation package. An example of the simulation information generated by the process is shown in FIG. 6. The simulation information generating step for the variable-equation type simulation package will be described with reference to FIGS. 37 and 6. First, a pointer is obtained from a variable/constant pointer slot of the calculation model head class 1301 to search a constant object. In accordance with the constant name and value stored in the slot, a "CONST" statement is generated (step 2001), Similarly, a variable object is searched and in accordance with the variable name stored in the slot, a "VAR" statement is generated (step 2002). Next, a pointer to the equation tree is obtained from an equation information object 1307 to trace the tree and search the boundary condition object. In accordance with the boundary condition equation and boundary region name stored in the object, a "BCOND" statement is generated (step 2003). Then, there is generated a "SCHEME" statement indicating the start of the numerical algorithm block (step 2004). Within the "SCHEME" statement, there is generated an "ITER" statement instructing an iteration with time while referring to the time dependency information included in a scheme object. Next, an equation tree is symbolically expanded in accordance with the numerical algorithms included in the equation information object, to generate each executable statement in accordance with the expanded equations. The phrase "symbolically expand" means that for example, if the implicit solution method is selected as the time-expansion algorithm, the time term "DT(V)" is replaced by "(V—VO)/DLT", i.e., the equation is replaced at the level of character strings. Such a replacement method may be stored in a table corresponding to an algorithm name to be used at step 2006. Alternatively, such a method may be prepared in advance as one of the methods for each algorithm class, to initiate it at step 2006. After expanding and outputting all equations in the calculation model 1301, there is generated an "END ITER" statement indicating the end of the numerical algorithm block, to thereby complete the simulation generating step. Each simulation package may have slight differences in the file format for the mesh file 22. Therefore, a mesh pointed by the mesh object 1302 is subject to transformation if necessary, and the transformed mesh is written in the mesh file 22.

The selected simulation package reads the generated simulation information 21 and mesh file 22 to execute a numerical simulation and output the results. A user can observe the graphic display of the results via the interface 17. The foregoing is the description of the operation and process flow of the present embodiment.

Modifications of the Invention

Several modifications of the present invention will be described. A two-dimensional problem is used in the embodiment as an example of the problem to be solved. Numerical algorithms for numerical simulation do not change with the dimension, so that the present invention is applicable to two- and three-dimensional problems. In the embodiment, partial differential equations describing a physical phenomenon are solved. The invention is also applicable to a problem described with ordinary differential equations. Furthermore, in the embodiment, physical phenomena such as fluid flow and heat conduction have been described for the description simplicity. The invention is also applicable to other physical phenomenon analysis such as diffusion analysis, electro-magnetic field analysis, and structural analysis, described with differential equations.

In the above embodiment, an object-oriented paradigm is used which can reduce duplicated knowledge and efficiently manage the system. The invention can also be reduced in practice without using the object-oriented paradigm. In the case of a Pascal language for example, a class can be expressed by a record, and a slot can be expressed by a field of the record. Furthermore, the invention can also be reduced in practice without using the pointer structure. For example, such as shown in FIGS. 39 to 41, the equation database may be realized by a table using physical characteristic values as key indices, and the algorithm database may be realized by a table using mathematical characteristic values as key indices. In this manner, the database can be realized using the characteristic values derived by the system.

According to the present invention, a user inputs the shape of a problem, a name of material of each region, a name of a subject physical phenomenon, and several boundary condition names and boundary values. With these inputs, it is possible to automatically generate equations describing the problem, numerical algorithms for solving the problem, and meshes. Therefore, a numerical simulation of the problem can be executed without requesting the user to have knowledge of mathematical and numerical techniques.

According to the present invention, a mesh and time step are generated while considering the performance of generated numerical algorithms, so that the obtained mesh division and time step satisfy the numerical conversion and stability condition. Therefore, the user can obtain the solution of numerical simulation without try-and-error for an optimum mesh size and time step.

Furthermore, according to the present invention, even if there are a plurality of simulation packages usable by a user, one of the simulation packages suitable for solving a problem can be automatically selected, and the numerical simulation is executed. Therefore, the user can execute the simulation without a good understanding of which simulation package is to used for a given problem.

We claim:

1. A method of simulating a physical quantity of a physical quantity of a known physical phenomenon through material analysis of a partial differential equation, the method comprising steps executed by a computer, the steps include:

receiving from an operator physical information representing a simulation subject, said physical information including information representing a shape of a region of the simulation subject, information representing a name of at least one material constituting the region, and information representing a boundary condition which the physical quantity of the known physical phenomenon should satisfy on at least one boundary of the region;

searching automatically by the computer, a material database based on a name assigned to a material and determining one of a constant value independent of the physical quantity and a value dependent on the physical quantity, as a material constant;

determining, automatically by the computer, the partial differential equation used for the simulation subject in accordance with the physical information and equation database;

detecting, automatically by the computer, a mathematical characteristic of the determined partial differential equation, in accordance with the structure of the determined partial differential equation and the determined material constant;

retrieving, automatically by the computer, a solution algorithm for numerical analysis of the determined partial differential equation from an algorithm database, using the mathematical characteristic; and numerically, automatically by the computer, analyzing the determined partial differential equation for the simulation subject using the retrieved solution algorithm.

2. A simulation method according to claim 1, wherein said step of numerically analyzing includes the steps of:

selecting one simulation program for numerically analyzing said determined partial differential equation using the retrieved solution, from a plurality of predetermined simulation programs, each of which is provided for one of a plurality of partial differential equations to be respectively numerically analyzed in accordance with predetermined specific solution algorithms for a corresponding one of the plurality of partial differential equations; and executing the selected simulation program for the simulation subject represented by the physical information, in accordance with the physical information.

3. A simulation method according to claim 1, wherein said step of numerically analyzing includes the steps of:

generating a simulation program for numerical analysis of the determined partial differential equation for the simulation subject represented by the physical information, in accordance with the physical information and the determined partial differential equation; and executing the generated simulation program.

4. A simulation program generating method according to claim 3, wherein said step of generating a simulation program includes the steps of:

generating input information described in a first high-level language including differential operators, in accordance with the physical information and the determined partial differential equation, said input information including a first program portion describing the simulation subject represented by the physical information and a second program portion describing successive calculation for numerical analysis of the determined partial differential equation; and generating a simulation program described in a second high-level language not including differential operators by using the generated input information, the generated simulation program executing the successive calculation described in the second program portion relative to the simulation subject described in the first program portion.

5. A simulation method according to claim 1, wherein said step of determining a partial differential equation includes the steps of:

calculating a value of at least one predetermined physical characteristic quantity for the physical phenomenon at the region, in accordance with at least one information contained in the physical information; and determining the partial differential equation for the simulation subject, in accordance with the value of the at least one physical characteristic quantity.

6. A simulation method according to claim 5, wherein said method of determining the partial differential equation in accordance with the value of the at least one physical characteristic quantity includes the steps of:

selecting one or more terms necessary for the simulation from a plurality of terms constituting one predetermined partial differential equation for describing the known physical phenomenon, in accordance with the value of the at least one physical characteristic quantity and a predetermined discrimination condition of the at least one physical characteristic quantity; and determining the partial differential equation for the simulation subject, in accordance with the selected one or more terms.

7. A simulation method according to claim 6, wherein said step of selecting one or more terms is executed for each of the plurality of terms constituting the predetermined partial differential equation using a database storing information indicative of the physical characteristic quantity defined in association with the term and a range of the value of the physical characteristic quantity defined for use of the term, respectively.

* * * * *

UNITED STATES PATENT AND TRADEMARK OFFICE
CERTIFICATE OF CORRECTION

PATENT NO. : 5,408,638
DATED : April 18, 1995
INVENTOR(S) : Nobutoshi Sagawa, et al.

It is certified that error appears in the above-indentified patent and that said Letters Patent is hereby corrected as shown below:

Claim 1, column 22, line 54, after "searching" insert --,--.

Claim 1, column 23, line 6, delete the "." and substitute therefor --,--.

Claim 2, column 23, line 19, after "algorithms" insert --,--.

Signed and Sealed this

Thirteenth Day of June, 1995

*Attest:*

BRUCE LEHMAN

*Attesting Officer*     *Commissioner of Patents and Trademarks*